(12) United States Patent
Kim et al.

(10) Patent No.: US 11,398,054 B2
(45) Date of Patent: Jul. 26, 2022

(54) APPARATUS AND METHOD FOR DETECTING FOG ON ROAD

(71) Applicant: Seoul Institute of Technology, Seoul (KR)

(72) Inventors: Kyung Won Kim, Daegu (KR); Won Seok Jung, Suwon-si (KR)

(*) Notice: Subject to any disclaimer, the term of this patent is extended or adjusted under 35 U.S.C. 154(b) by 94 days.

(21) Appl. No.: 17/064,571

(22) Filed: Oct. 6, 2020

(65) Prior Publication Data

US 2022/0028118 A1  Jan. 27, 2022

(30) Foreign Application Priority Data

Jul. 22, 2020 (KR) .................. 10-2020-0091173

(51) Int. Cl.
*G06T 7/90* (2017.01)
*G06V 10/56* (2022.01)
*G06T 7/60* (2017.01)

(52) U.S. Cl.
CPC .............. *G06T 7/90* (2017.01); *G06T 7/60* (2013.01); *G06V 10/56* (2022.01); *G06T 2207/30192* (2013.01)

(58) Field of Classification Search
CPC .......... G06T 7/90; G06T 7/60; G06T 2207/30192; G06T 7/13; G06T 7/543; G06T 2207/10028; G06V 10/56; G06V 10/22; G06V 20/00; G08B 3/10; H04N 5/2259; H04N 7/18
USPC ........................................ 382/103
See application file for complete search history.

(56) References Cited

U.S. PATENT DOCUMENTS

| | | | | |
|---|---|---|---|---|
| 2005/0232469 A1* | 10/2005 | Schofield | .................. | G06T 7/20 382/104 |
| 2012/0233841 A1* | 9/2012 | Stein | .................... | G03B 17/566 396/428 |
| 2015/0310304 A1* | 10/2015 | Robert | ...................... | G06T 7/12 382/104 |
| 2015/0324692 A1* | 11/2015 | Ritchey | ................. | A61B 5/1114 348/36 |

(Continued)

FOREIGN PATENT DOCUMENTS

| | | |
|---|---|---|
| KR | 10-1219659 | 1/2013 |
| KR | 10-1364727 | 2/2014 |

(Continued)

OTHER PUBLICATIONS

English Specification of 10-1880850.

(Continued)

*Primary Examiner* — Ali Bayat
(74) *Attorney, Agent, or Firm* — Antonio Ha & U.S. Patent, LLC

(57) ABSTRACT

According to an embodiment, a device for detecting fog on a road comprises an imaging device installed to capture a two-way road and capturing a fog on the two-way road, a network configuring device provided under the imaging device and transmitting an image captured by the imaging device, a fog monitoring device receiving the image from the network configuring device, analyzing the image to thereby detect the fog, and outputting an alert per predetermined crisis level, and a display device displaying the alert output from the fog monitoring device and transmitting the alert via a wired or wireless network.

9 Claims, 21 Drawing Sheets

(56) References Cited

U.S. PATENT DOCUMENTS

2020/0293041 A1* 9/2020 Palanisamy .............. G06N 3/08

FOREIGN PATENT DOCUMENTS

| KR | 10-1748524 | 6/2017 |
| KR | 10-1880850 | 7/2018 |
| KR | 10-1949968 | 2/2019 |

OTHER PUBLICATIONS

English Specification of 10-1364727.
English Specification of 10-1949968.
English Specification of 10-1748524.
English Specification of 10-1219659.

* cited by examiner

Fig. 13

| Settings | | | | x |
|---|---|---|---|---|
| Range 1 | | Range 2 | | |
| Maximum distance for object recognition | ☐ | Maximum distance for object recognition | ☐ | |
| Coordinates of object | ☐ | Coordinates of object | ☐ | |
| Altitude of recording | ☐ | Altitude of recording | ☐ | |
| Zero-distance constant | ☐ | Zero-distance constant | ☐ | |
| Lens standard focal length | ☐ | Lens standard focal length | ☐ | |
| Lens setting focal length | ☐ | Lens setting focal length | ☐ | |
| Vertical angle of recording | ☐ | Vertical angle of recording | ☐ | |
| Visual range efficiency per coordinate | ☐ | Visual range efficiency per coordinate | ☐ | |
| Non-linear correction factor | ☐ | Non-linear correction factor | ☐ | |

Separation point ☐    Monitoring point ☐ ☐                    [Apply] [Cancel]

Fig. 15

APPARATUS AND METHOD FOR DETECTING FOG ON ROAD

CROSS-REFERENCE TO RELATED APPLICATION(S)

This application is based on and claims priority under 35 U.S.C. 119 to Korean Patent Application No. 10-2020-0091173, filed on Jul. 22, 2020, in the Korean Intellectual Property Office, the disclosure of which is herein incorporated by reference in its entirety.

TECHNICAL FIELD

Embodiments of the disclosure relate to a device and method for detecting fog on the road.

DESCRIPTION OF RELATED ART

In Korea, large-scale traffic accidents are repeatedly occurring due to bad weather such as fog, snow, rain, and wind, and socio-economic damage due to loss of life is increasing. In particular, fog interferes with the driver's vision and causes it difficult for the driver to secure a safe distance, resulting in a higher chance of serious traffic accidents.

When the traffic capability and stability of the road decrease due to bad weather such as fog, snow, rain, wind, etc., the meteorological agency detects fog using a visibility system, but visibility systems are installed in limited sites due to high costs.

Accordingly, a number of methods for fog detection using images are currently being conducted, which include a method of detecting fog by extracting several fog features from an input image and measuring the similarity with the learning data or a method for detecting fog by calculating the visual range (or visibility) using the vehicle highlights.

Korean Patent Nos. 10-1880850, issued on Jul. 20, 2018, 10-1364727, issued on Feb. 20, 2014, and 10-1949968, issued on Feb. 21, 2019 disclose a configuration for detecting fog using temporal filtering and a correlation between saturation and brightness in a road driving image by setting a region within a predetermined distance or more from a vanishing point, as a region of interest, and calculating a ratio of saturation channel to brightness channel for the region of interest to thereby obtain the feature of detecting fog and applying temporal filtering using information about the saturation channel-brightness channel ratio of adjacent frames, a configuration including detecting a valid region needed to be analyzed to detect fog in an image, performing fog detection analysis on each of daytime fog detection and nighttime fog detection using a reference depth map and an image correction matrix, calculating a visual range according to the result, and determining the foggy condition, and a configuration in which the amount of transmission is corrected using a dark channel algorithm and a guided filter and a fog contour line is determined.

However, fog forecasting is useless if real-time detection of a situation where it is foggy or clear is impossible. The above-described configurations use a large amount of network and computing resources to detect fog from an image and thus suffer from slow processing and even inaccuracy, resultantly failing to meet immediacy and presentness.

Further, it is expensive to establish an infrastructure for such configurations because the configurations need to use depth cameras, not common CCTV-based surveillance cameras.

Therefore, a need exists for a device and method for quickly and accurately detecting fog to prevent social and economic damage caused by fog generated on the road.

SUMMARY

According to various embodiments, there may be provided a road fog detection device and method that may quickly and precisely detect fog to prevent social, economical damage due to fog on the road, provide substantially the same effects as a depth camera does, using a common CCTV camera, by converting fixed objects into coordinates, per visual range, identify the region pattern of the fog in an image, and quickly and accurately output the visual range.

However, the objects of the embodiments are not limited thereto, and other objects may also be present.

According to an embodiment, a device for detecting fog on a road comprises an imaging device installed to capture a two-way road and capturing a fog on the two-way road, a network configuring device provided under the imaging device and transmitting an image captured by the imaging device, a fog monitoring device receiving the image from the network configuring device, analyzing the image to thereby detect the fog, and outputting an alert per predetermined crisis level, and a display device displaying the alert output from the fog monitoring device and transmitting the alert via a wired or wireless network.

The imaging device may include a camera capturing the two-way road, a bracket provided under the camera and adjusting a direction thereof using a bolt and a nut, a median strip guardrail fixing base formed in a double-winged structure to be mounted on a median strip guardrail without damaging the median strip guardrail and fixed to, or removed from, the median strip guardrail using a bolt and a nut, and a supporting pole connecting the bracket with the median strip guardrail fixing base and adjusting a height thereof using at least one bolt.

The fog monitoring device may include an image receiver installed within a predetermined distance from a site where the imaging device is installed and storing the image from the camera of the imaging device and outputting the image, an image analyzer equipped with a fog detection program configured to detect the fog using the image output from the image receiver, receiving image settings for the site where the imaging device is installed, a fog detection condition, and an crisis level determination condition, and outputting a detection result corresponding to the received image settings, the fog detection condition, and the crisis level determination condition, and a result display displaying information resultant from detecting and analyzing the fog by the image analyzer and transmitting the displayed information via the wired or wireless network.

The image settings may be intended to set at least one element value for distance calculation according to an installation environment of the camera of the imaging device. The fog detection condition and the crisis level determination condition may correspond to system settings.

According to an embodiment, a fog alerting method performed by a fog alerting device comprises receiving an image transmitted from an imaging device capturing a two-way road and calculating a distance to a site where a fog occurs, determining a contour of the fog from the image and then recognizing the fog by determining a region of the fog from the determined contour, and calculating a distance between a position of the imaging device and a visible point recognized in the image and, when the distance between the position of the imaging device and the visible point corresponds to a distance per predetermined level, outputting an alert corresponding to the distance per predetermined level.

Receiving the image transmitted from the imaging device capturing the two-way road and calculating the distance to the site where the fog occurs may include converting a road image in the image into a two-dimension (2D) plane with coordinates, establishing image settings for setting at least one element value for distance calculation to calculate the distance to the site where the fog occurs, from the image, calculating the distance to the site where the fog occurs, using the at least one element value for distance calculation and an equation represented as:

$$R = n\left\{\frac{D_{max}(Y_{max} - Y)}{e + D_{max}Y_{max}}\right\}^{-f} - n + s \times H \times \frac{L_{set}}{L_{std}} \times e^v$$

Here, R denotes the distance to the site where the fog occurs, n denotes a correction constant for near distance, Dmax denotes a maximum distance, Ymax denotes maximum coordinates, Y denotes fog recognition coordinates, e denotes a correction constant for effective distance, f denotes a correction constant for far distance, s denotes a correction constant for shortest distance, H denotes a height or altitude, Lset denotes a lens setting focal length, Lstd denotes a lens standard focal length, and v denotes a correction constant for vertical angle.

Determining the contour of the fog from the image and then recognizing the fog by determining the region of the fog from the determined contour may include setting a strength of extraction of the contour of the fog and selecting a lower end of a vertical contour by selecting and separating a horizontal contour among a plurality of contours, when an original color of the selected lower end of the vertical contour is a chromatic color, excluding the vertical contour, and determining that a contour in a predetermined analysis target space is the contour of the fog. The contour of the fog may be determined using a Sobel edge detector.

Determining the contour of the fog from the image and then recognizing the fog by determining the region of the fog from the determined contour may include when the region of the fog is determined, extracting a contour of a predetermined analysis target space from the contour of the fog, determining a red-green-blue (RGB) value of a color coordinate system from the contour of the predetermined analysis target space, determining a fog feature value based on the RGB value, when an RGB value of a coordinate neighboring any one coordinate in the contour of the predetermined analysis target space is smaller than the fog feature value, selecting the any one coordinate, and recognizing the fog by displaying the selected any one coordinate on a space. Recognition analysis of the fog may be performed by pattern recognition analysis including a flood fill scheme.

Calculating the distance between the position of the imaging device and the visible point recognized in the image and, when the distance between the position of the imaging device and the visible point corresponds to the distance per predetermined level, outputting the alert corresponding to the distance per predetermined level may include, when the distance to the visible point is less than 1 km, estimating the occurrence of the fog and outputting an alert corresponding to a distance for each of low, moderate, high, and extreme levels as the distance to the visible point reduces.

The alert corresponding to the distance for each level may indicate a normal level when the distance to the visible point is 1 km or more, the low level when the distance to the visible point is less than 1 km, the moderate level when the distance to the visible point is less than 250 m, the high level when the distance to the visible point is less than 100 m, and the extreme level when the distance to the visible point is less than 50 m.

According to various embodiments of the disclosure, the road fog detection device and method may quickly and precisely detect fog to prevent social, economical damage due to fog on the road, provide substantially the same effects as a depth camera does, using a common CCTV camera, by converting fixed objects into coordinates, per visual range, identify the region pattern of the fog in an image, and quickly and accurately output the visual range.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein:

FIGS. 12, 13, 14, and 15 are views illustrating screens of a program for driving a fog monitoring device in a road fog detection device according to an embodiment of the disclosure.

DETAILED DESCRIPTION

Figure 1:
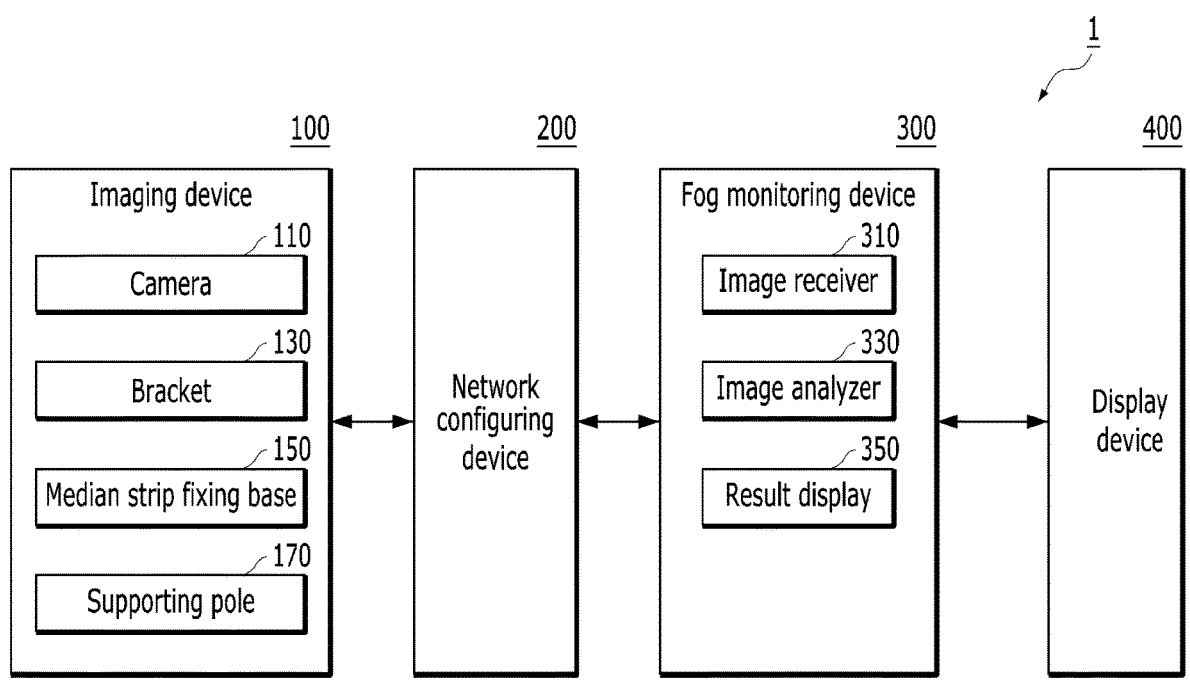
FIG. 1 is a block diagram illustrating a device for detecting fog on the road according to an embodiment of the disclosure.

Hereinafter, exemplary embodiments of the inventive concept will be described in detail with reference to the accompanying drawings. The inventive concept, however, may be modified in various different ways, and should not be construed as limited to the embodiments set forth herein. Like reference denotations may be used to refer to the same or similar elements throughout the specification and the drawings.

However, the present disclosure may be implemented in other various forms and is not limited to the embodiments set forth herein.

For clarity of the disclosure, irrelevant parts are removed from the drawings, and similar reference denotations are used to refer to similar elements throughout the specification.

In embodiments of the present disclosure, when an element is "connected" with another element, the element may be "directly connected" with the other element, or the element may be "electrically connected" with the other element via an intervening element.

When an element "comprises" or "includes" another element, the element may further include, but rather than excluding, the other element, and the terms "comprise" and "include" should be appreciated as not excluding the possibility of presence or adding one or more features, numbers, steps, operations, elements, parts, or combinations thereof.

When the measurement of an element is modified by the term "about" or "substantially," if a production or material tolerance is provided for the element, the term "about" or "substantially" is used to indicate that the element has the same or a close value to the measurement and is used for a better understanding of the present disclosure or for preventing any unscrupulous infringement of the disclosure where the exact or absolute numbers are mentioned.

As used herein, "step of" A or "step A-ing" does not necessarily mean that the step is one for A.

As used herein, the term "part" may mean a unit or device implemented in hardware, software, or a combination thereof.

One unit may be implemented with two or more hardware devices or components, or two or more units may be implemented in a single hardware device or component.

However, the components are not limited as software or hardware but may rather be configured to be stored in a storage medium or to execute one or more processors.

Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables.

A function provided in an element or a 'unit' may be combined with additional elements or may be split into sub elements or sub units.

Further, an element or a 'unit' may be implemented to reproduce one or more CPUs in a device or a security multimedia card.

As used herein, some of the operations or functions described to be performed by a terminal or device may be, instead of the terminal or device, performed by a server connected with the terminal or device.

Likewise, some of the operations or functions described to be performed by a server may be performed by a terminal or device connected with the server, instead of the server.

As used herein, some of the operations or functions described to be mapped or matched with a terminal may be interpreted as mapping or matching the unique number of the terminal, which is identification information about the terminal, or personal identification information.

Hereinafter, embodiments of the disclosure are described in detail with reference to the accompanying drawings.

Figure 2A:
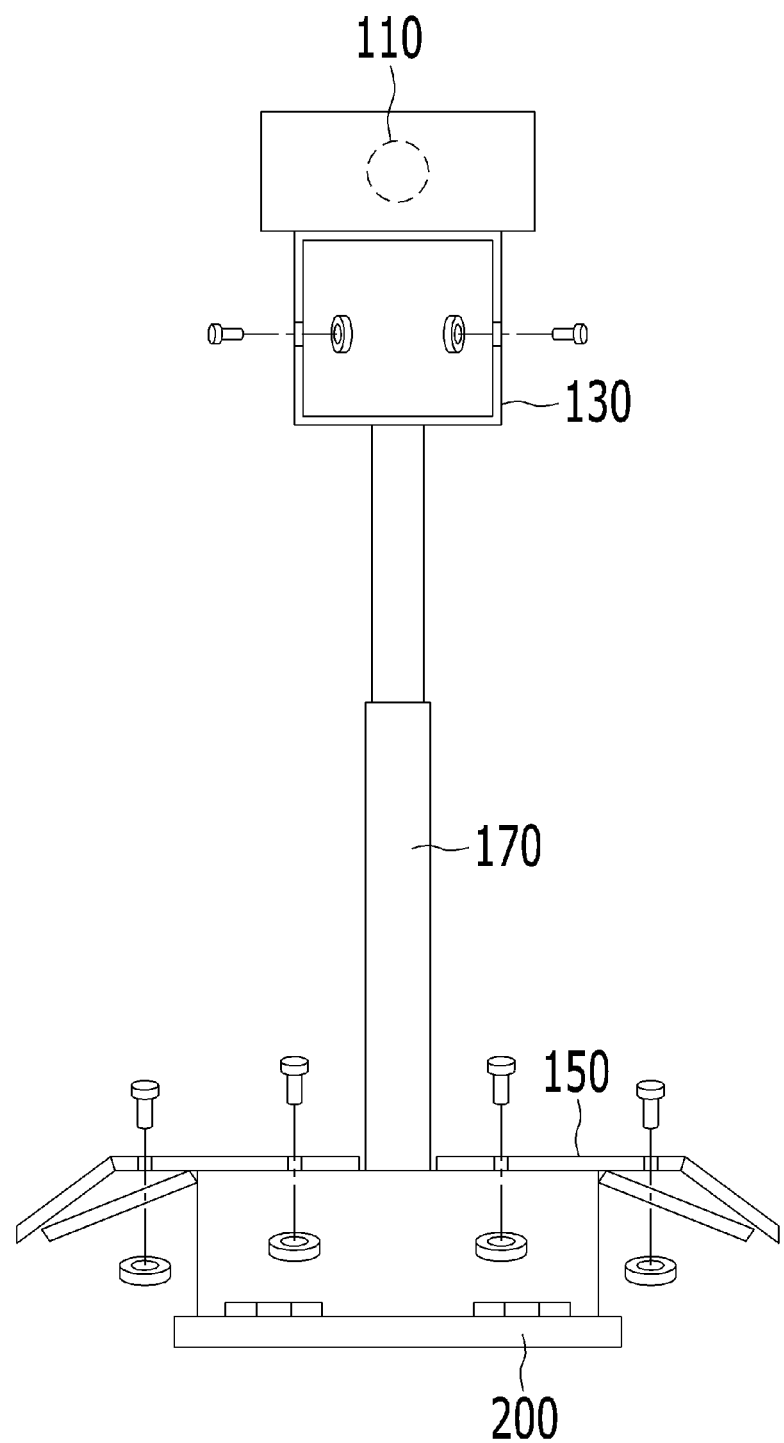
FIGS. 2A and 2B, respectively, are a front view and a rear view of an imaging device included in the road fog detection device of FIG. 1.
Figure 2B:
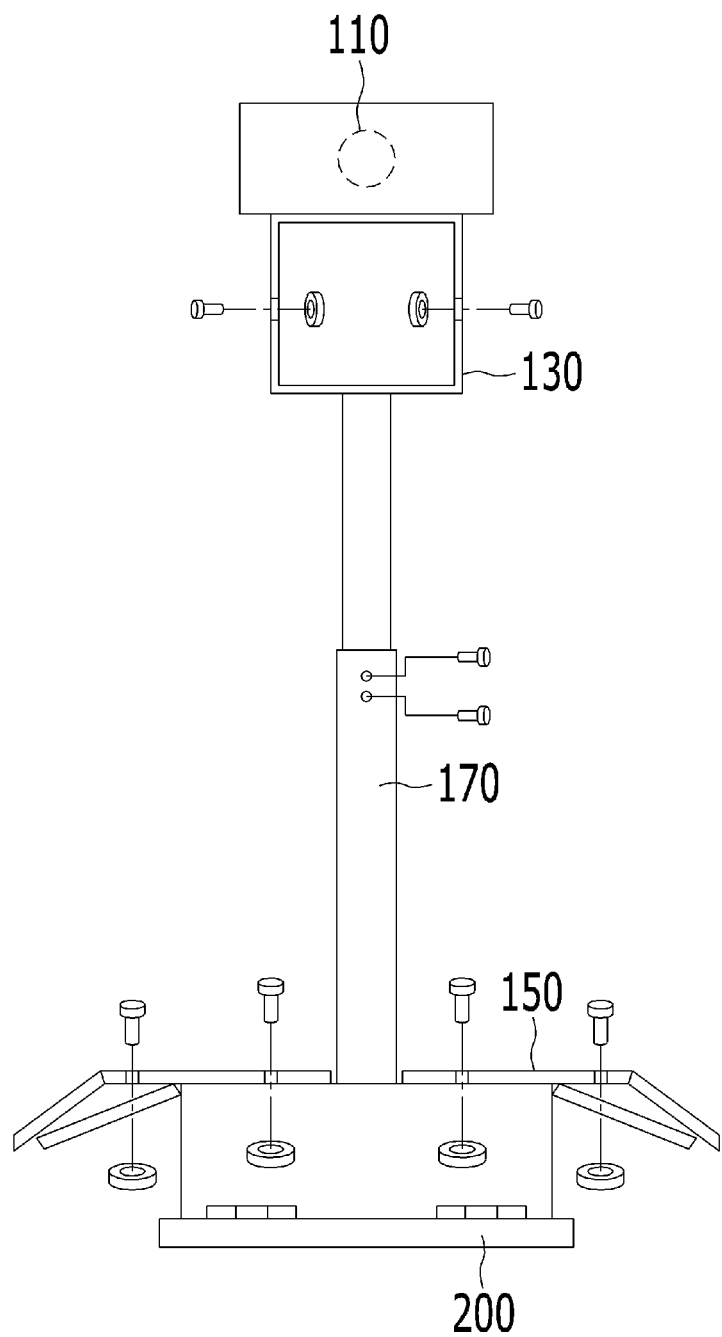

FIG. 1 is a block diagram illustrating a device for detecting fog on the road according to an embodiment of the disclosure. FIG. 2 illustrates a front view and rear view of an imaging device included in the road fog detection device of FIG. 1.

Referring to FIG. 1, a road fog detection device 1 may include an imaging device 100, a network configuring device 200, a fog monitoring device 300, and a display device 400.

However, the road fog detection device 1 is merely an example, and the scope of the present disclosure is not limited by FIG. 1.

The components of the road fog detection device 1 of FIG. 1 are connected to one another via a network.

For example, as shown in FIG. 1, at least one imaging device 100 may be connected with the fog monitoring device 300 via the network configuring device 200.

The fog monitoring device 300 may be connected with the network configuring device 200 and the display device 400 via a network.

At least one display device 400 may be connected with the fog monitoring device 300 via a network.

Here, the network means a connection structure capable of exchanging information between nodes, such as a plurality of terminals or servers, and examples of the network include local area networks (LANs), wide area networks (WANs), internet (world wide web (WWW)), wired/wireless data communication networks, telephony networks, or wired/wireless television communication networks.

Examples of the wireless data communication networks may include, but are not limited to, 3G, 4G, or 5G networks, 3rd Generation Partnership Project (3GPP) networks, Long Term Evolution (LTE) networks, Long Term Evolution-Advanced (LTE-A) networks, World Interoperability for Microwave Access (WIMAX) networks, Internet, Local Area Networks (LANs), wireless LANs, Wide Area Networks (WANs), Personal Area Networks (PANs), Bluetooth networks, near-field communication (NFC) networks, satellite broadcast networks, analog broadcast networks, and Digital Multimedia Broadcasting (DMB) networks.

As used herein, the singular forms "a," "an," and "the" are intended to include the plural forms as well, unless the context clearly indicates otherwise.

According to embodiments, a plurality of components of the same type may be a single component of the type, and one component may add one or more components of the same type.

The imaging device 100 may be installed to capture a two-way road and may capture an image of the two-way road.

Referring to FIG. 2, the imaging device 100 may include a camera 110 for photographing (or recording or capturing) the two-way road, a bracket 130 provided under the camera 110 to adjust the direction with bolts and nuts, and a median strip guardrail fixing base 150 formed in a double-winged structure to be mounted on a median strip without damaging the median strip guardrail and fixed to, or removed from, the median strip guardrail using bolts and nuts, and a supporting pole 170 connecting the bracket 130 with the median strip guardrail fixing base 150 and adjusting the height using at least one bolt.

The bolts and nuts of the bracket 130 allows for adjustment in the vertical direction, and the median strip guardrail fixing base 150 allows for adjustment in the horizontal direction and adjustment of the height.

The camera 110 may be a closed-circuit television (CCTV) camera. A housing surrounding the camera 110 may be further provided.

The network configuring device 200 may be provided under the imaging device 100 and may transmit or broadcast images captured (or obtained or recorded) by the imaging device 100.

The fog monitoring device 300 may receive the image transmitted from the network configuring device 200, analyze the received image to thereby detect fog, and output an alert predetermined per crisis level.

The fog monitoring device 300 may include an image receiver 310, an image analyzer 330, and a result display 350.

The image receiver 310 may be installed within a predetermined distance from the place where the imaging device 100 is installed. The image receiver 310 may receive the image from the camera 110 of the imaging device 100, store the received image, and output the received image to the image analyzer 330.

The image analyzer 330 may be equipped with a fog detection program for detecting fog using the image output from the image receiver 310. Image settings for each of the sites where the imaging devices 100 are installed and fog detection conditions and crisis level determination conditions may be input to the image analyzer 330, and the image analyzer 330 may output detection results corresponding to the image settings, fog detection conditions, and crisis level determination conditions.

The result display 350 may display information resultant from detecting and analyzing the fog by the image analyzer 330 and may transmit the displayed information via a wired or wireless network.

The image settings may be intended for setting at least one distance calculation component value according to the installation environment of the camera 110 of the imaging device 100. The image settings may be settings for at least one component or element for distance calculation according to the environment of installation of the camera 110 of the imaging device 100. The fog detection conditions and the crisis level determination conditions may correspond to system settings and are described below in detail.

The display device 400 may display the alert output from the fog monitoring device 300 and transmit the alert via a wired or wireless network.

The display device 400 may transmit the alert to a manager's terminal (not shown) which is present in a remote site. The display device 400 itself may be the manager's terminal which is present in the remote site.

Where the display device 400 is positioned in a remote site, the display device 400 may be connected with the fog monitoring device 300 via a wired or wireless network. Or, the fog monitoring device 300 and the display device 400 may be located in a remote site and receive the image or video, obtained or collected by the imaging device 100, from the network configuring device 200 and output the image or video. Other various arrangements and configurations may be possible for the display device 400 and the imaging device 100.

Operations of the road fog detection device of FIGS. 1 and 2 are described below in detail with reference to FIGS. 3 to 6.

However, what is described below is merely an example, and embodiments of the disclosure are not limited thereto.

Figure 3A:
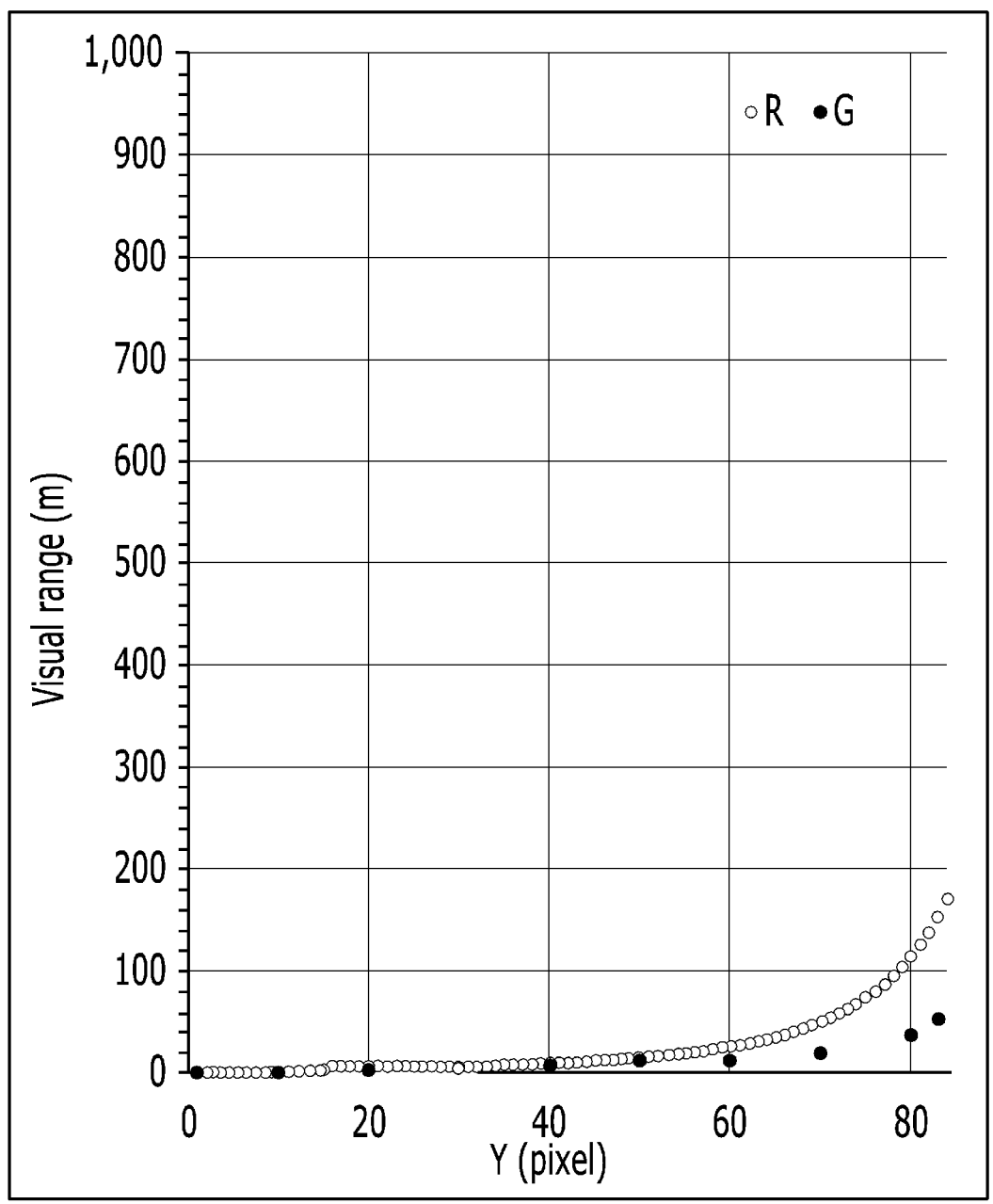
FIGS. 3A and 3B are graphs illustrating comparison between the calculated distance and the distance actually measured by a fog monitoring device in a road fog detection device according to an embodiment of the disclosure.
Figure 3B:
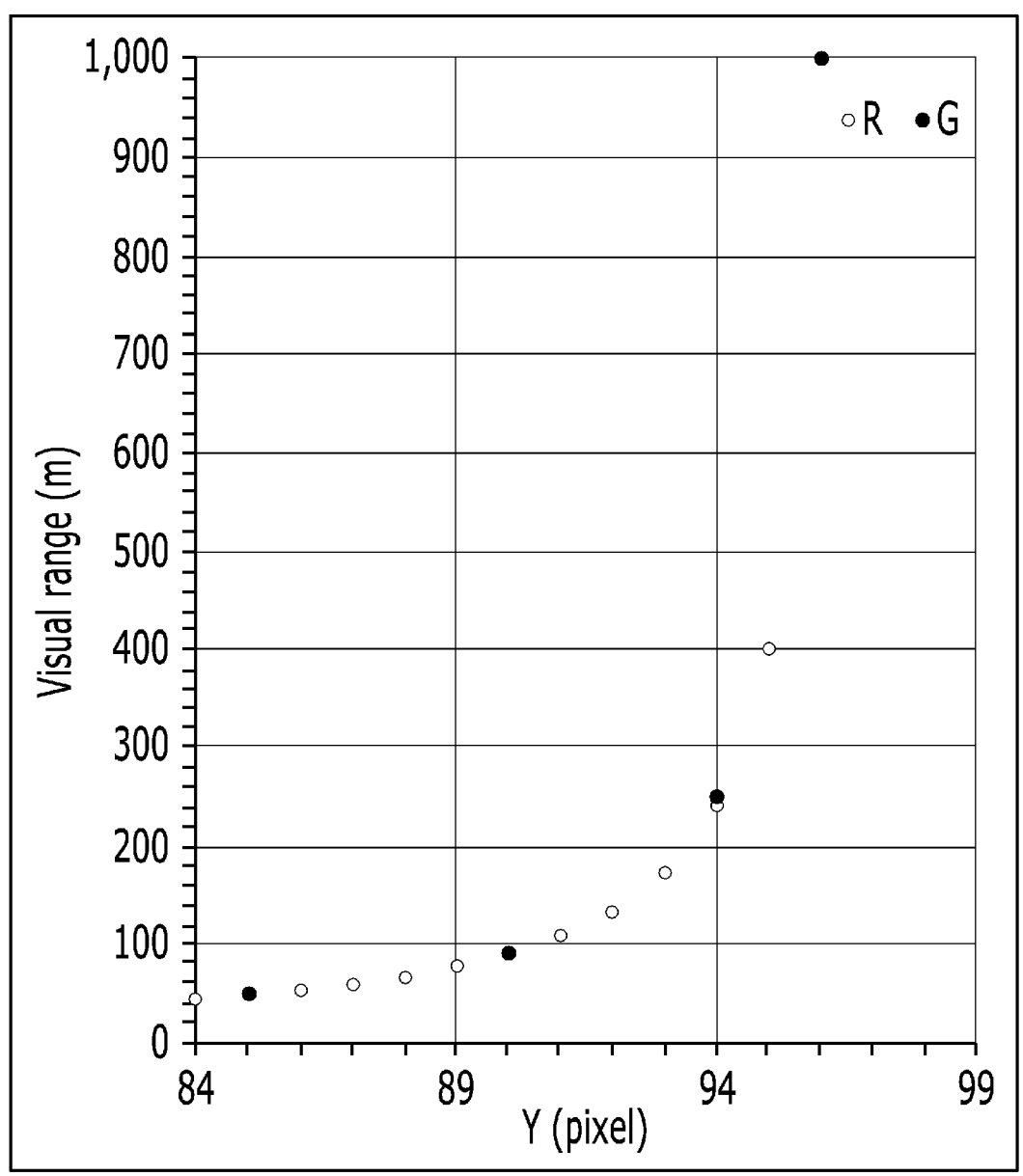
Figure 4A:
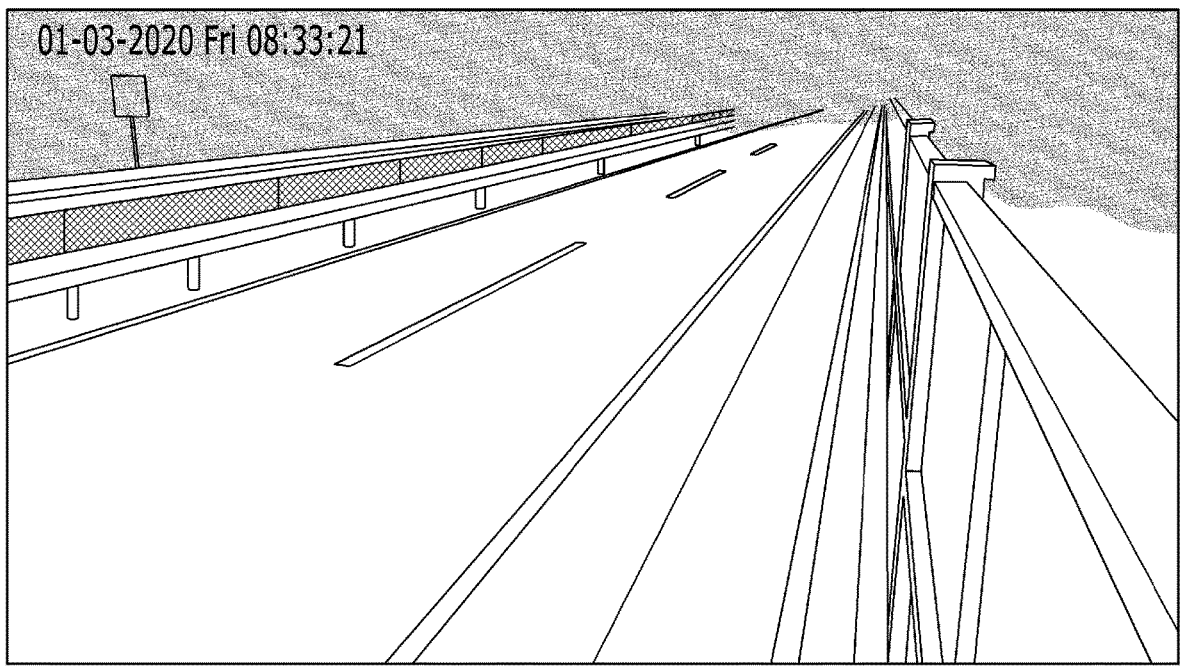
FIGS. 4A and 4B are views illustrating comparison between images before and after discriminating a contour of fog by a fog monitoring device in a road fog detection device according to an embodiment of the disclosure.
Figure 4B:
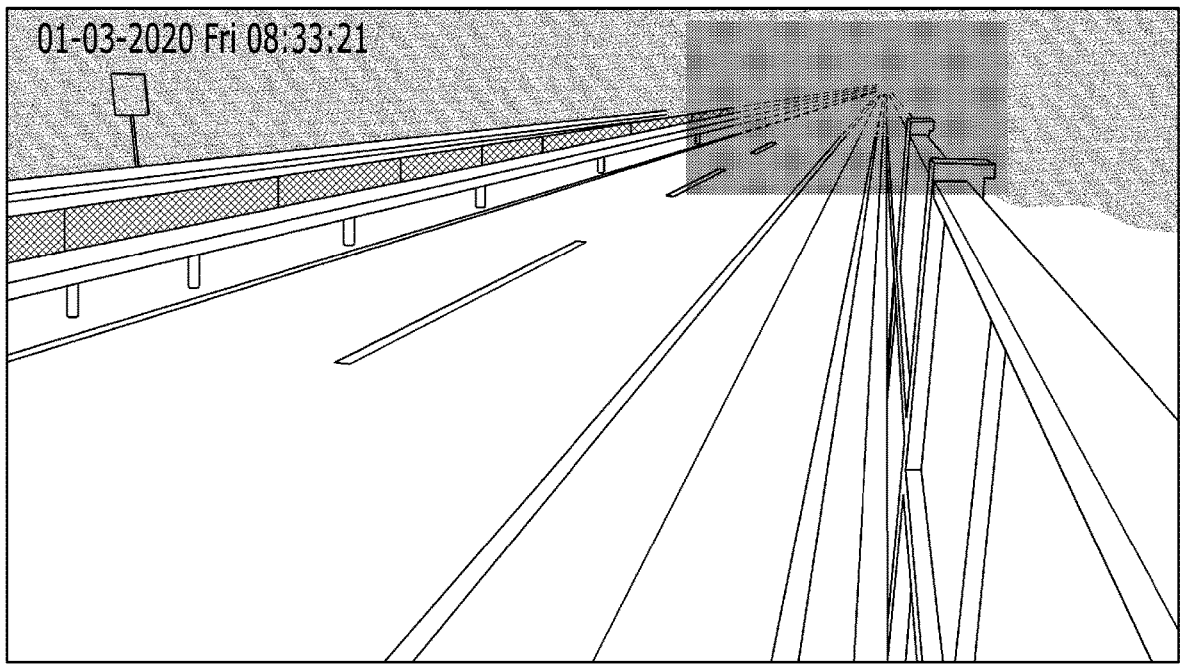
Figure 5:
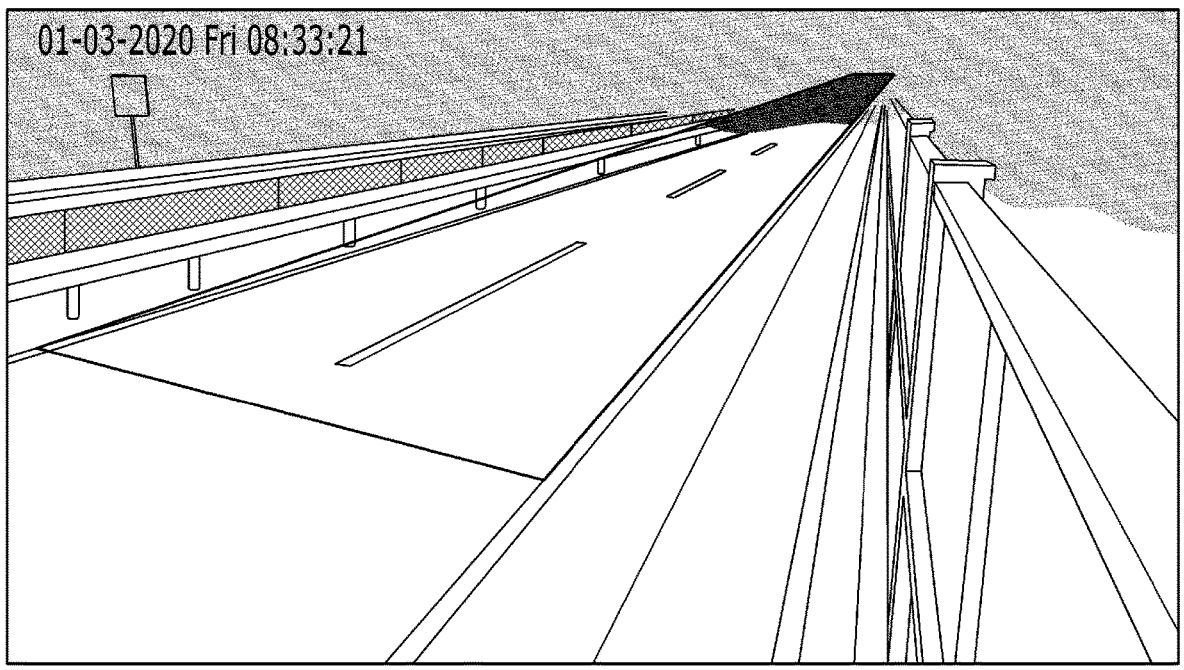
FIG. 5 is a view illustrating a region of fog displayed by a fog monitoring device in a road fog detection device according to an embodiment of the disclosure.
Figure 6A:
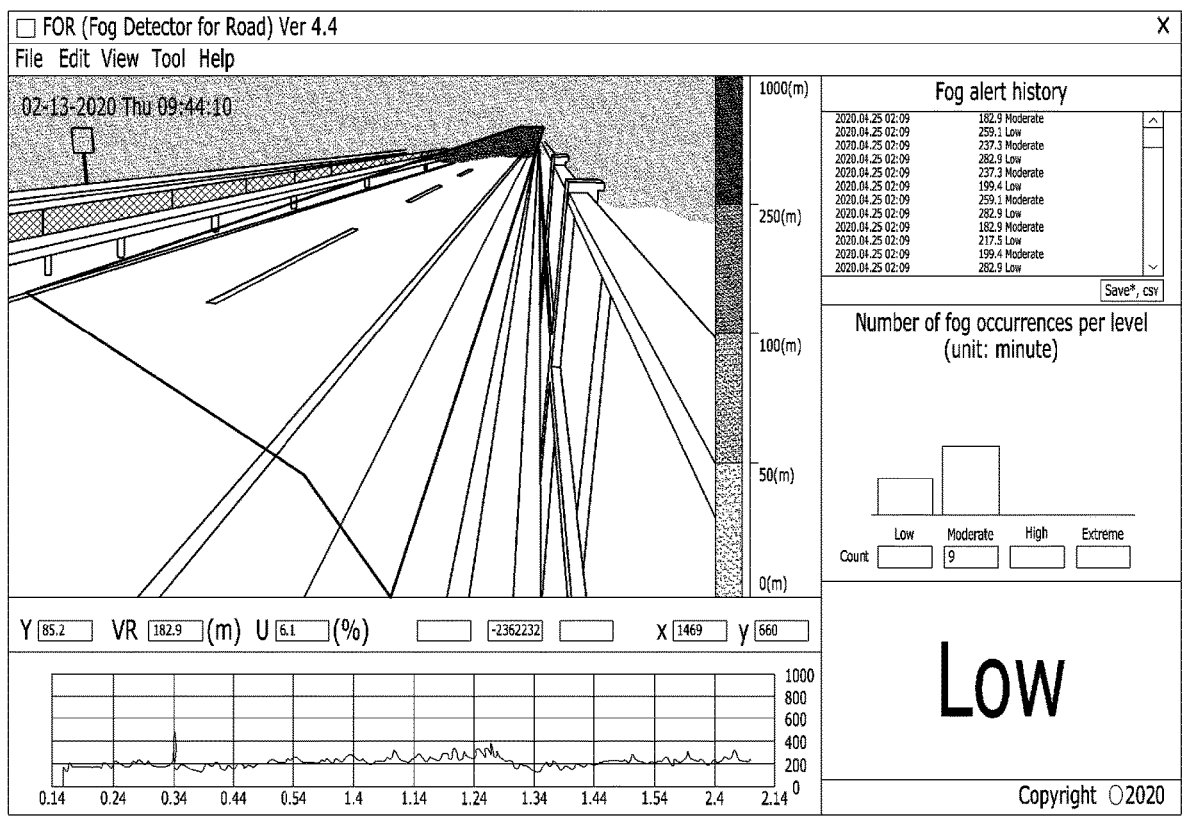
FIGS. 6A and 6B are views illustrating a screen on which a fog crisis level is displayed by a display device in a road fog detection device according to an embodiment of the disclosure.
Figure 6B:
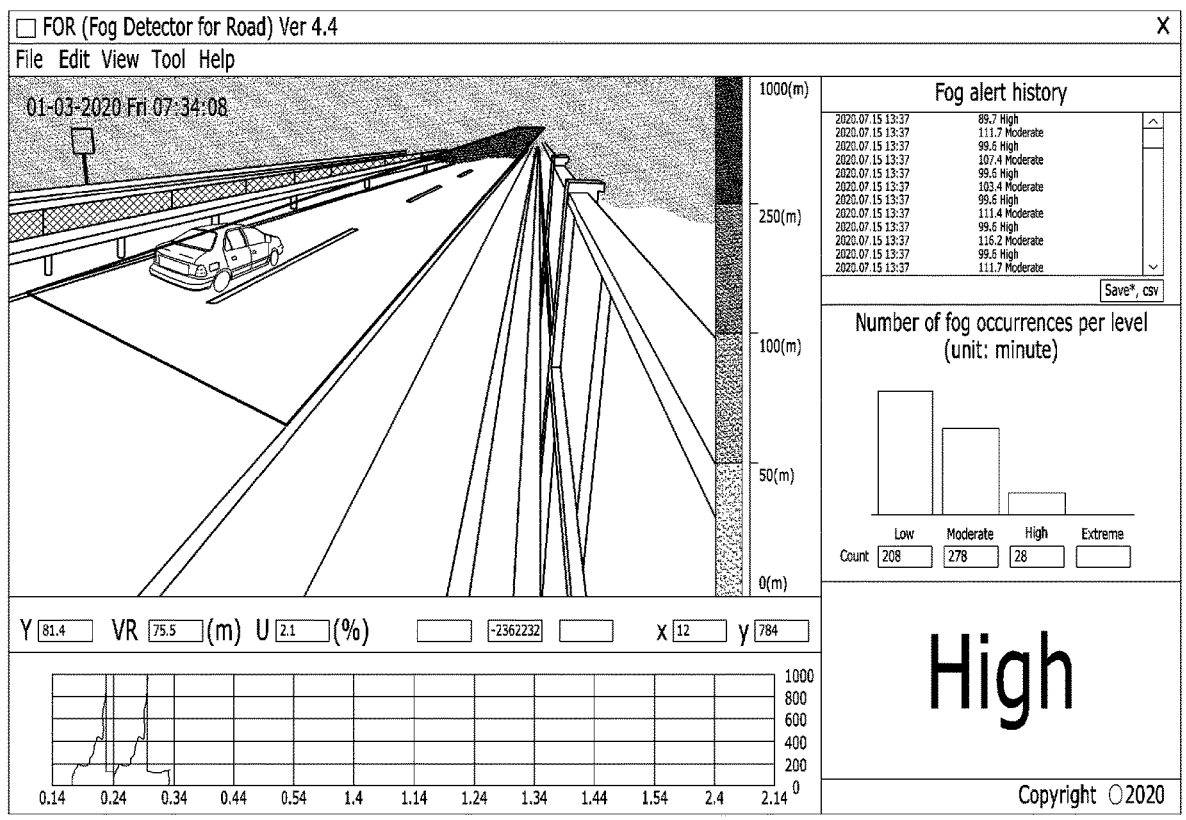

FIGS. 3A and 3B are graphs illustrating comparison between the calculated distance and the distance actually measured by a fog monitoring device in a road fog detection device according to an embodiment of the disclosure. FIGS. 4A and 4B are views illustrating comparison between images before and after discriminating a contour of fog by a fog monitoring device in a road fog detection device according to an embodiment of the disclosure. FIG. 4A illustrates an image before the contour of fog is discriminated by the fog monitoring device 300, and FIG. 4B illustrates an image after the contour of fog is discriminated by the fog monitoring device 300. FIG. 5 is a view illustrating a region of fog displayed by a fog monitoring device in a road fog detection device according to an embodiment of the disclosure. FIGS. 6A and 6B are views illustrating a screen on which a fog crisis level is displayed by a display device in a road fog detection device according to an embodiment of the disclosure.

According to an embodiment, a server (not shown) may interwork or interact with the fog monitoring device 300. When the server transmits a road fog detection application, program, apppage, or webpage to at least one imaging device 100 and at least one display device 400, the at least one imaging device 100 and the at least one display device 400 may install or open the road fog detection application, program, apppage, or webpage.

Further, a service program may be driven or run on the at least one imaging device 100 and the at least one display device 400 using a script executed on a web browser.

Here, the web browser may be a program or application that enables use of world wide web (WWW) services or that receives and shows hypertext written in the hypertext markup language (HTML), and the web browser may include, e.g., Netscape, Explorer, or Chrome.

The term "application" may mean an application executed on the terminal, and the application may include, e.g., an app running on a mobile terminal, e.g., a smartphone.

According to an embodiment, a fog alert method may include three steps including a first step for calculating a distance to where a fog occurs, a second step for recognizing the fog, and a third step for detecting and determining the fog.

The steps are sequentially described below.

<First Step>

The fog monitoring device 300 may receive an image or video transmitted from the imaging device 100 which captures a two-way road and calculate the distance to where a fog occurs.

Figure 11:
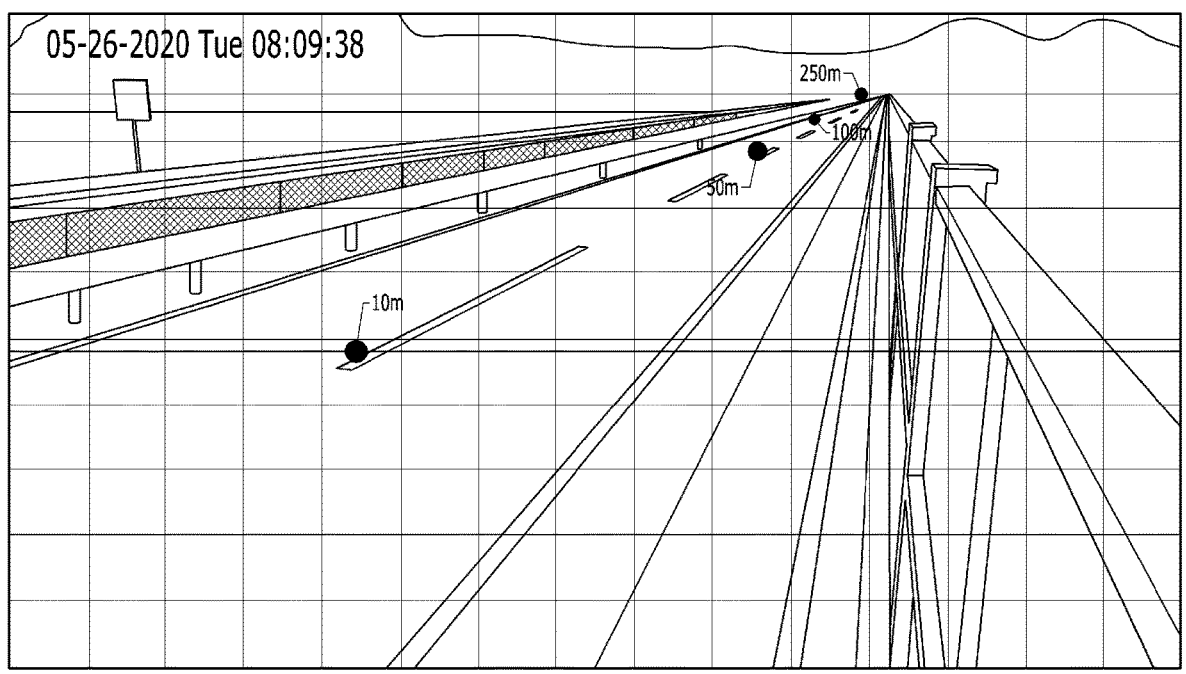
FIG. 11 is a view illustrating a screen in which per-object distance information for coordinates is input to an image captured by an imaging device in a road fog detection device according to an embodiment of the disclosure.

The fog monitoring device 300 converts the road image into a two-dimension (2D) plane or screen with coordinates and calculates a distance, e.g., the distance between a fixture or object in the image and the camera 110. The fog monitoring device 300 may divide the screen into predetermined sizes as shown in FIG. 11. The fog monitoring device 300 displays the position of each fixture in the image and the actual position of each fixture away from the camera 110 to thereby render it possible how long visual range is secured when a fog occurs. For example, the fog monitoring device 300 may convert the road image into a coordinate system or a grid pattern as shown in FIG. 11. For example, the fog monitoring device 300 may place vertical and horizontal lines to the road image so that the coordinates of any fixture or object in the image may be calculated or obtained.

The fog monitoring device 300 may determine a non-linear function for calculating the distance from the image. Elements, e.g., variables and constants, for distance calculation may include the maximum coordinates (Ymax), fog recognition coordinates (Y), maximum distance (Dmax), minimum distance (Dmin), correction constant (s) for shortest distance), correction constant (n) for near distance, correction constant (f) for far distance, correction constant (v) for vertical angle, correction constant (e) for effective distance, height (or altitude) (H), lens standard focal length (Lstd), and lens setting focal length (Lset). The elements may be summarized as in Table 1 below.

TABLE 1

| | Variables | Description |
|---|---|---|
| Maximum coordinate | Ymax | Largest Y coordinate to identify fog in analysis image |
| Fog recognition coordinate | Y | Y coordinate of fog recognized |
| Maximum distance | Dmax | Largest distance of Y coordinate to identify fog in analysis image |
| Minimum distance | Dmin | Distance in which Y coordinate is 0 in analysis image |
| Correction constant for shortest distance | s | Constant for correcting the distance, where Y coordinate is 0, into measured value in analysis image |
| Correction constant for near distance | n | Constant for correcting near distance Y coordinate into measured value upon identifying according to perspective |
| Correction constant for far distance | f | Constant for correcting far distance Y coordinate into measured value upon identifying according to perspective |
| Correction constant for vertical angle | v | Constant for correcting the shortest distance, with influence by vertical angle of camera reflected |
| Correction constant for effective distance | e | Constant for correcting to allow the distance to be calculated effectively |
| Height or altitude | H | Height of camera above sea level |
| Lens standard focal length | Lstd | Standard focal length of camera lens |
| Lens setting focal length | Lset | (pre)set focal length of camera lens |

The fog monitoring device 300 may actually measure the distance of a target space for analysis of fog occurrence in the image. The distance (or range) R from the analysis target space in the image to where the fog occurs may be calculated according to Equation 1 below.

In other words, the fog monitoring device 300 may convert the road image in the image into a 2D plane or screen with coordinates, configure image settings for setting at least one element for distance calculation to calculate the distance to where fog occurs from the image, and calculate the distance to where the fog occurs using the at least one element for distance calculation and the following equations.

$$R = n\left\{\frac{D_{max}(Y_{max} - Y)}{e + D_{max}Y_{max}}\right\}^{-f} - n + s \times H \times \frac{L_{set}}{L_{std}} \times e^v \quad \text{[Equation 1]}$$

Here, R is the distance to where fog occurs, n is the correction constant for near distance, Dmax is the maximum distance, Ymax is the maximum coordinates, Y is the fog recognition coordinates, e is the correction constant for effective distance, s is the correction constant for shortest distance, f is the correction constant for far distance, v is the correction constant for vertical angle, H is the height or altitude, Lstd is the lens standard focal length, and Lset is the lens setting focal length.

As described above, the fog monitoring device 300 may determine each element, value, or constant, such as the correction constant for shortest distance, the correction constant for near distance, the correction constant for far distance, the correction constant for vertical angle, and the correction constant for effective distance. An upper limit of the correction distance (e) of effective distance may be determined as in Equation 2 so that the calculated distance is not infinite.

$$e = D_{max}Y_{max}\left[\frac{1}{1 - \left\{\left(D_{max} - s \times H \times \frac{L_{set}}{L_{std}} \times e^v\right)/n + 1\right\}^{-\frac{1}{f}}} - 1\right] \quad \text{[Equation 2]}$$

The shortest distance of the image may be influenced by the installation conditions of the camera and be determined by the height, lens focal length, correction constant for vertical angle, and correction constant for shortest distance. The shortest distance of the image may be determined as in Equation 3.

$$D_{min} = s \times H \times \frac{L_{set}}{L_{std}} \times e^v \quad \text{[Equation 3]}$$

The fog monitoring device 300 may apply the function separately per distance so as to correct the differences in the perspective of the image per coordinate and may use multiple functions to enhance the accuracy of the calculated distance. Settings for an example function, applied separately to two sections, to calculate the distance to where the fog occurs are shown in Table 2.

TABLE 2

| | Ymax | Dmax | Dmin | s | n | f | v | e | H | Lstd | Lset |
|---|---|---|---|---|---|---|---|---|---|---|---|
| Section 1 | 89 | 1000 | 3.2332 | 1.08 | 3.9 | 1.275 | −2.4 | 1162.622 | 33 | 50 | 50 |
| Section 2 | 89 | 1000 | 13.2723 | 0.6 | 1.5E−15 | 3930 | −0.4 | 8480792 | 33 | 50 | 50 |

Referring to FIGS. 3A and 3B, the optimal Y coordinate at which the sections (e.g., section 1 and section 2) are separated from each other so that the calculated distance is most approximate to the (actually) measured distance is determined and is referred to as a separation point. The Y coordinate, as the separation point, is determined to be 84 in the above example function. The graph of FIG. 3A shows a pixel section from 1 to 84 in the 2D-coordinated image to compare the measured distance G and the calculated distance R. The graph of FIG. 3B shows a pixel section from 84 to 89 in the 2D-coordinated image to compare the measured distance G and the calculated distance R.

The Y coordinate of the fog recognized in the image is represented in pixels and ranges from 0 pixels to 100 pixels. In the graphs, one interval corresponds to 0.1 pixel.

The distance to the fog, corresponding to the Y coordinate of the fog, may be calculated by the determined function. The function may be divided to calculate the distance to the fog, which is approximate to the measured distance. As necessary, the function may be applied separately to three or more sections.

<Second Step>

The fog monitoring device 300 may determine the contour of the fog in the image and then recognize the fog by determining the region of the fog in the determined contour.

The second step may be largely divided into two substeps: one for identifying the contour of the fog; and the other for displaying the region of the fog.

Referring to FIGS. 4A and 4B, to identify the contour of the fog, the fog monitoring device 300 may set a strength of extraction of the contour of the fog, select and separate a horizontal contour from a plurality of contours to thereby select a lower end of a vertical contour, exclude the selected lower end of the vertical contour if the original color of the vertical contour is a chromatic color, and determine that a contour in a predetermined analysis target space is the contour of the fog.

To determine the contour of the fog, a Sobel edge detector may be used.

Referring to FIG. 5, to display the region of the fog, the fog monitoring device 300, if the region of the fog is determined, may extract the contour of a predetermined analysis target space from the contour of the fog and determine an RGB value of a color coordinate system from the contour of the predetermined analysis target space.

The fog monitoring device 300 may determine a feature value of the fog based on the RGB value, if the RGB value of a coordinate neighboring a specific coordinate in the contour of the predetermined analysis target space is smaller than the fog feature value, select the specific coordinate, display the selected specific coordinate in space, and recognize the fog.

As a pattern recognition analysis method used to display the region of the fog, a flood fill scheme may be used, which fills the fog pattern in red or black or in other colors and displays the same in the image.

Figure 15:
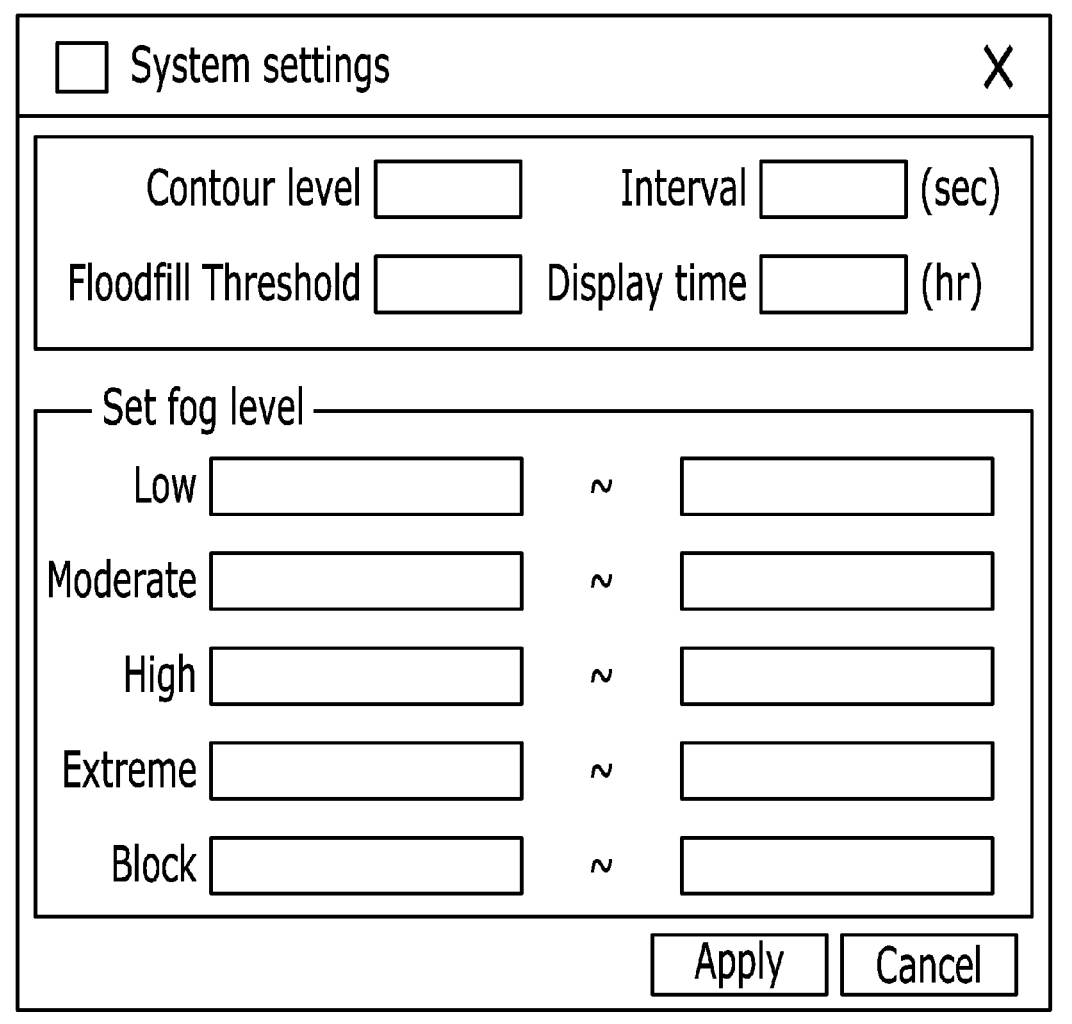

The strength of extraction of the fog contour and the fog feature value may be included in the system settings shown in FIG. 15 and may be input as numerical values.

<Third Step>

The fog monitoring device 300 may calculate the distance to a visible point recognized in the image, from the position of the imaging device 100. For example, the fog monitoring device 300 may calculate the distance between the visible point recognized in the image and the position of the imaging device 100. If the distance to the visible point corresponds to a distance per predetermined level, the fog monitoring device 300 may output an alert corresponding to the distance per predetermined level.

The third step may be largely divided into two substeps: one for detecting the fog; and the other for determining and displaying the fog per crisis level.

In the substep of detecting the fog, the fog monitoring device 300 may calculate the distance between the position of the camera 110 and the visible point, estimate the presence of fog within the distance if the distance to the visible point is less than 1 km, and determines that there is a fog when a variation in the distance within which there is estimated to be a fog falls within an allowable value or range.

For example, unless the visibility of 1 km or more is secured, the fog monitoring device 300 may estimate that there is a fog.

Referring to FIGS. 6A and 6B, for the substep of determining and displaying the fog per crisis level, the fog monitoring device 300 may output an alert corresponding to the distance for each of "low," "moderate," "high," and "extreme" levels as the distance to the visible point reduces.

The alert corresponding to the distance for each level may be set to a normal level when the distance to the visible point is 1 km or more, a low level when the distance to the visible point is less than 1 km, a moderate level when the distance to the visible point is less than 250 m, a high level when the distance to the visible point is less than 100 m, and an extreme level when the distance to the visible point is less than 50 m.

What is not described regarding the road fog detection method in connection with FIGS. 3 to 6 is the same or easily inferred from what has been described regarding the road fog detection device in connection with FIGS. 1 and 2, and no detailed description thereof is thus presented.

Figure 7:
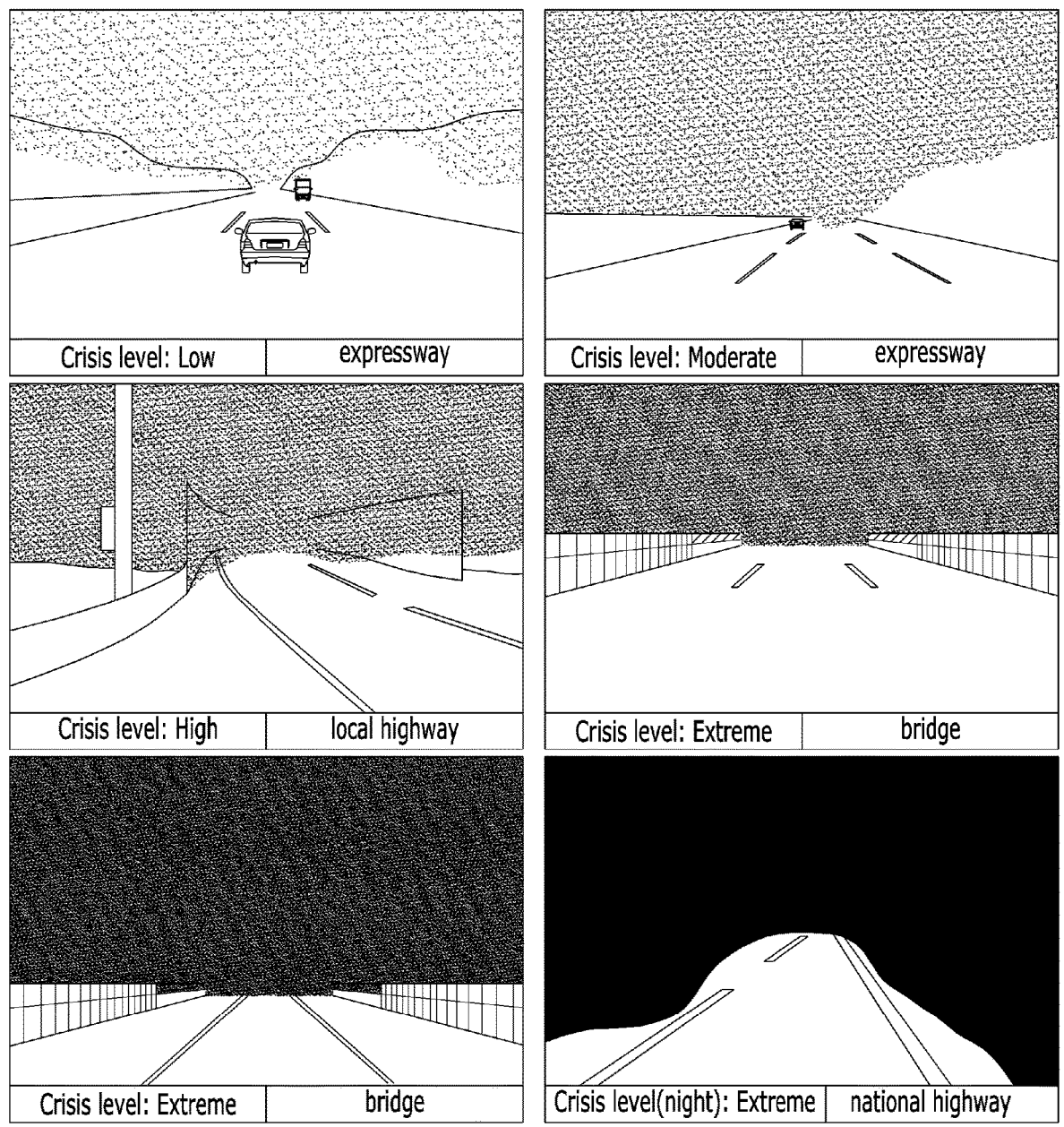
FIG. 7 is a view illustrating road images and alerts corresponding to per-level distances displayed on a display device in a road fog detection device according to an embodiment of the disclosure.
Figure 8:
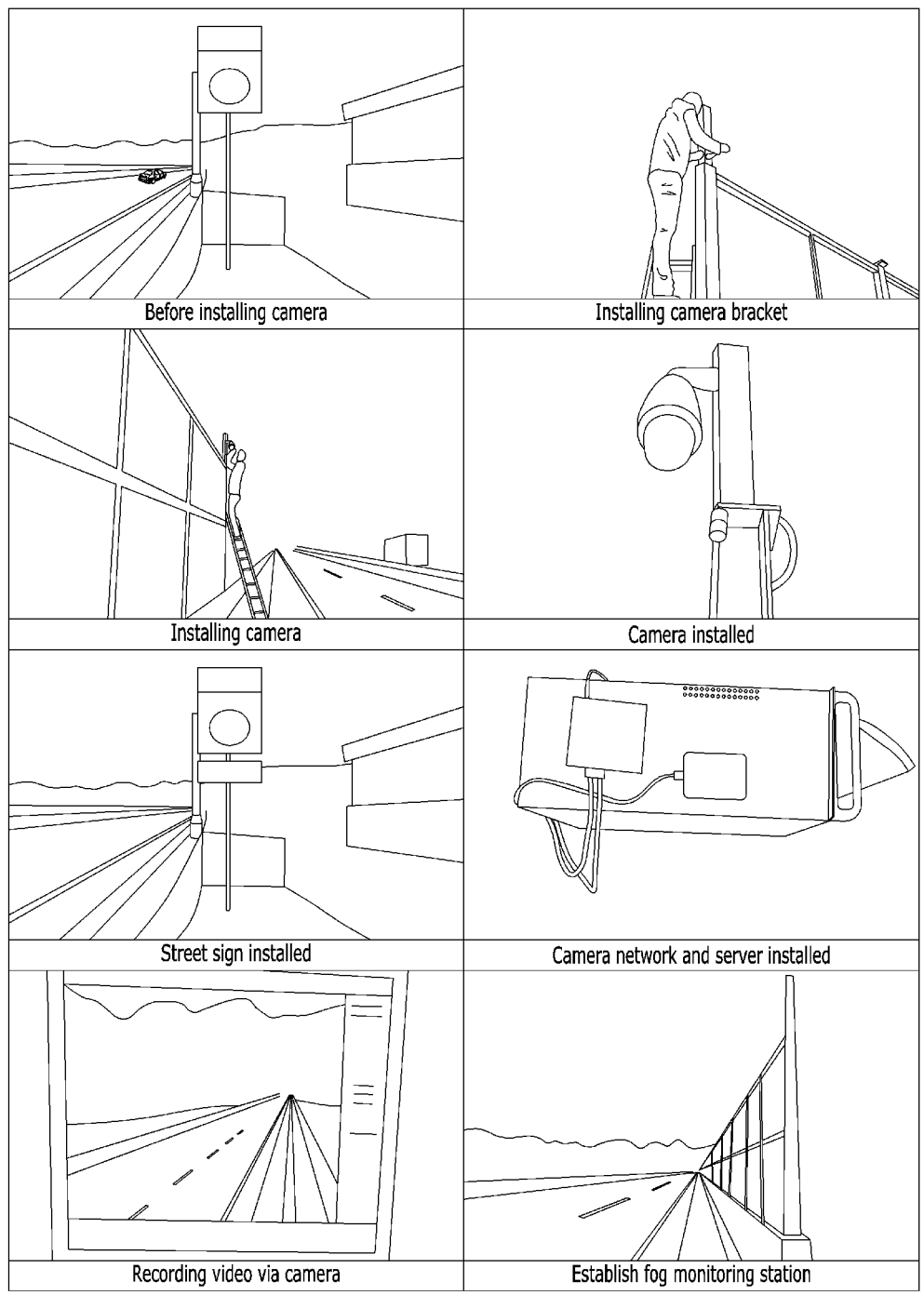
FIG. 8 is a view illustrating an example of installing a road fog detection device according to an embodiment of the disclosure.
Figure 9:
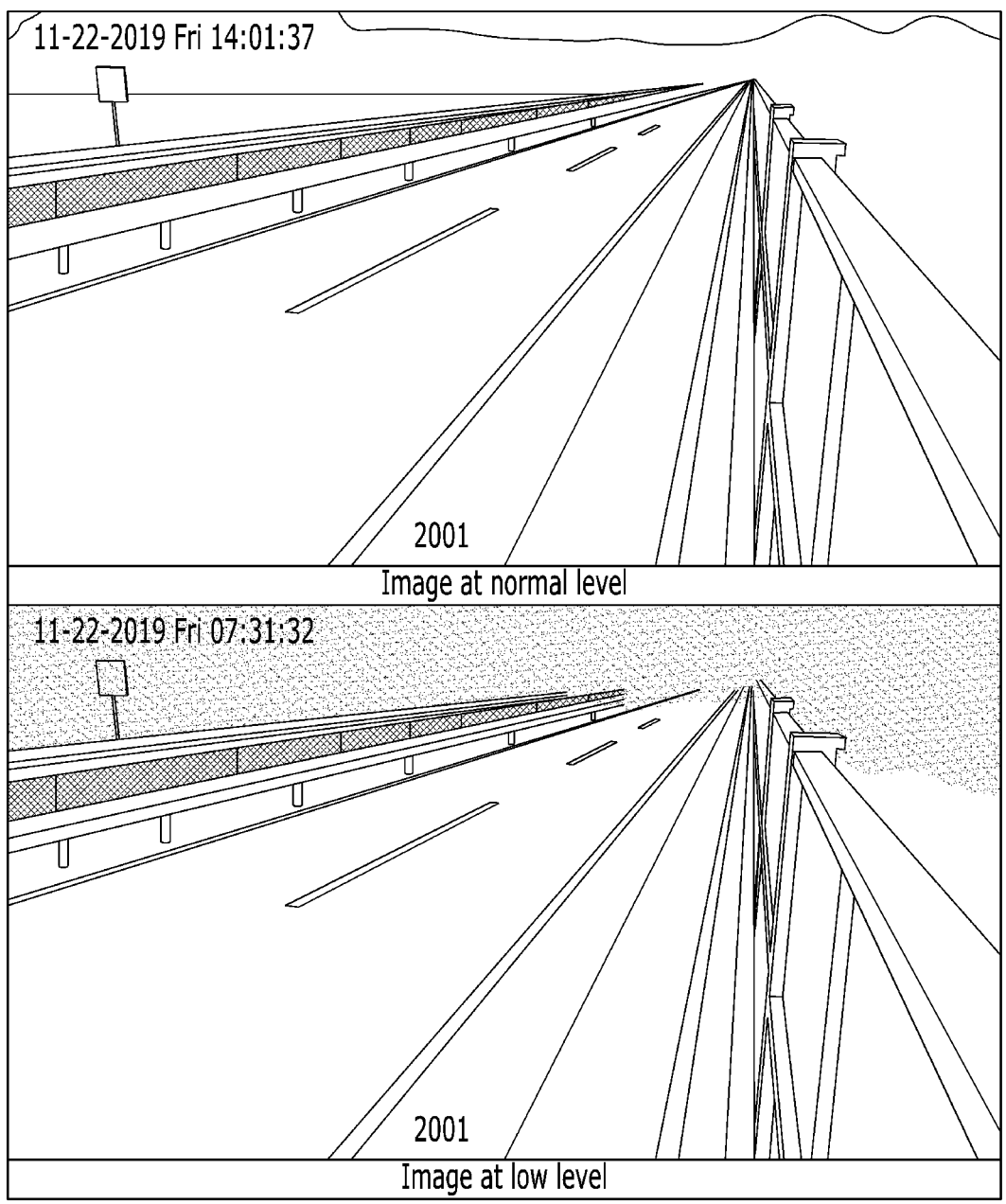
FIG. 9 is a view illustrating an image in a normal level and an image in a level of interest, displayed in a high resolution, on a road fog detection device according to an embodiment of the disclosure.
Figure 10:
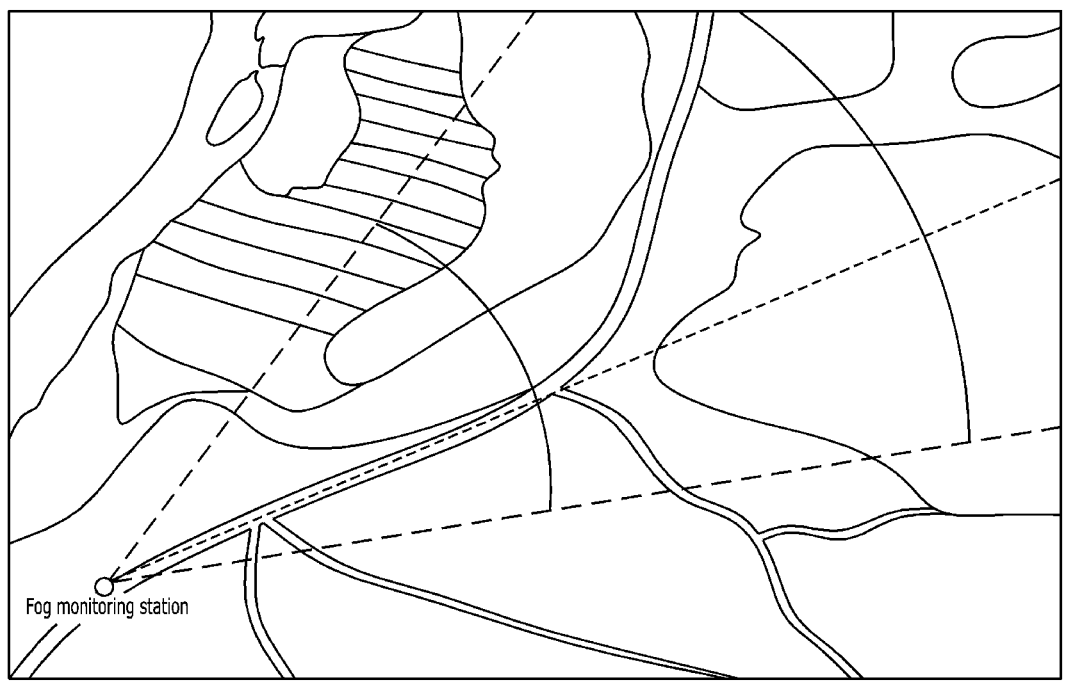
FIG. 10 is a view illustrating geographical information for selecting a place where a road fog detection device is to be installed, according to an embodiment of the disclosure.
Figure 16:
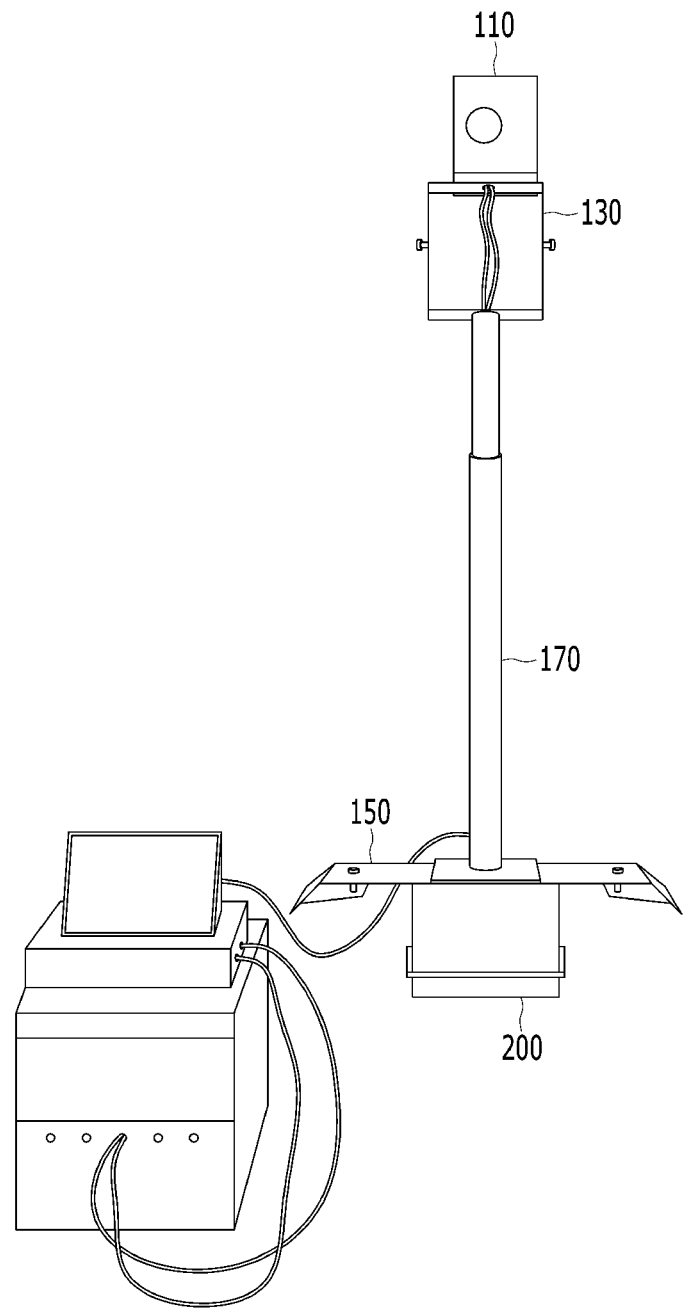
FIGS. 16 and 17 are photos of a prototype imaging device of a road fog detection device and an installation site according to an embodiment of the disclosure.
Figure 17:
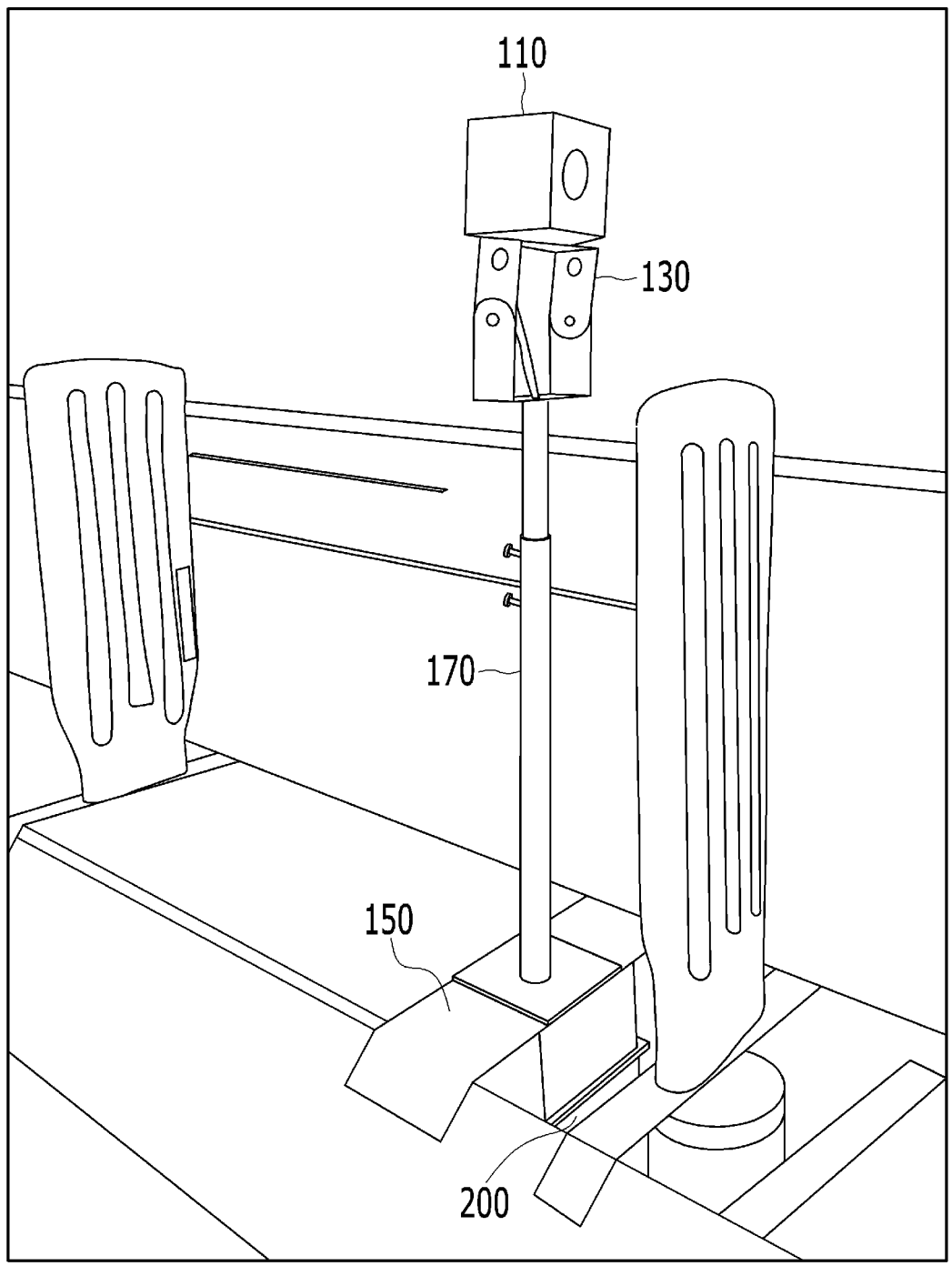

FIG. 7 is a view illustrating road images and alerts corresponding to per-level distances displayed on a display device in a road fog detection device according to an embodiment of the disclosure. FIG. 8 is a view illustrating an example of installing a road fog detection device according to an embodiment of the disclosure. FIG. 9 is a view illustrating an image in a normal level and an image in a level of interest, displayed in a high resolution, on a road fog detection device according to an embodiment of the disclosure. FIG. 10 is a view illustrating geographical information for selecting a place where a road fog detection device is to be installed, according to an embodiment of the disclosure. FIG. 11 is a view illustrating a screen in which per-object distance information for coordinates is input to an image captured by an imaging device in a road fog detection device according to an embodiment of the disclosure. FIGS. 12, 13, 14, and 15 are views illustrating screens of a program for driving a fog monitoring device in a road fog detection device according to an embodiment of the disclosure. FIGS. 16 and 17 are photos of a prototype imaging device of a road fog detection device and an installation site according to an embodiment of the disclosure.

A series of steps or processes for selecting a place where fog is to be actually measured, installing a road fog detection device, and determining a fog are described below with reference to FIGS. 7 to 15.

Embodiments

Referring to FIG. 7, to establish criteria for determination per crisis level, the road fog detection device 1, according to an embodiment, may establish a database including per-case standard images or videos for fog detection for the low/moderate/high/extreme levels or cases.

Still images or videos may be obtained or secured separately for expressways, national highways, bridges, and local highways. Measurement stations may be established in fog-prone areas, and CCTV or surveillance cameras for fog observation and an infrastructure of a remote transmission server may be installed.

Next, it is identified whether a measurement device measurement station can be installed in the target area. The measurement device or station may be installed in the area where the four crisis levels may be identified and visibility may be secured, and power and space for installation may be provided, and no other hazards are present.

Then, the camera 110 and the bracket 130 are installed in the target area meeting the above conditions as shown in FIG. 8.

A database of high-definition images captured for fog on the road at or around the fog monitoring (measurement) station may be established as shown in FIG. 9. A local image database transmitted from the camera 110 of the fog monitoring station may be received and stored in real-time by a remote site, so that it may be identified whether a fog occurs at the remote site, and per-case (e.g., per-level, e.g., low/moderate/high/extreme) still images or photos may be stored.

The (CCTV) camera 110 may back up high-definition (e.g., a resolution of 1920(H)×1080(V)) videos and store the still images of the videos. It is also possible to classify image material or data necessary for analysis of the features of the road fog, to grasp a target object and obstacles in the image, and to configure the image to standard formats (e.g., view angle/domain).

FIG. 10 shows geographic information about a fog monitoring station. The fog monitoring station on a road in Paju City, South Korea, is located at 37° 58'37.78 north latitude 126° 56'33.54 east longitude, and 33 m altitude above sea level. On general national highway No. 37 near 475-4 Gaekhyeon-ri, Jeokseong-myeon, Paju-si, Gyeonggi-do, South Korea, the angle of view is set in the southeast direction. A hill is located 1.5 km ahead to the left, and Gamak mountain is located 2.4 km to the right. In the foreground, the vertical angle is set by a general observation field viewed by the observer who is in upright position. In a general national highway with curved sections connected to a straight section, the straight section is about 1.1 km long, and the curved sections are about 0.8 km long. The capturing (or recording or photographing) direction may be controlled to prevent backlighting or over-saturation caused when the sun is located at the meridian altitude. An analysis image domain may be configured to develop an analysis algorithm capable of measuring the visual range, with the actual distance reflected, as an image-based measurement method that may supplement the real-time eye observation.

Then, as shown in FIG. 11, the distance information of the standard image may be mapped. The measured distance may be obtained based on the results of field observation, geographical information, and image feature analysis, and the standard image may be converted or rendered to include coordinates, and the distance information may be extracted, and visual range mapping may be performed.

The standard image distance information may be derived or obtained. The measured distance of the image may be obtained using a measuring tape, string (50 m long), or roller-type distance measuring device. Per-object distance information for the coordinates of the two-dimension (2D) image may be input.

Then, the visual range may be calculated by fog pattern recognition and be compared with the measured distance. For fog detection, a contour extraction scheme and a pattern recognition scheme may be performed stepwise to determine a range of fog in the image. For contour extraction and analysis, an algorithm may be used which adopts a Sobel edge detector.

An allowable level may be set considering color information features of the target image for analysis, and a contour extraction algorithm may be configured for each of the still image and the video.

An interface for allowing the user to adjust the range of extraction of the contour may be implemented. The pattern recognition analysis may be implemented as an algorithm adopting a flood fill scheme.

In this case, the color information feature analysis of fog may be reflected, and the standard deviation D for per-coordinate RGB components of the analysis target image may be calculated or obtained by Equation 4 below.

$$D_{R,j} = \sqrt{\frac{\sum_{i=1}^{n}(R_{ij}-m_{R,j})^2}{n}},$$

$$D_{G,j} = \sqrt{\frac{\sum_{i=1}^{n}(G_{ij}-m_{G,j})^2}{n}},$$

$$D_{B,j} = \sqrt{\frac{\sum_{i=1}^{n}(B_{ij}-m_{B,j})^2}{n}}$$

$$D_j = \frac{D_{R,j}+D_{G,j}+D_{B,j}}{3}$$

[Equation 4]

Comparison is performed on fog pattern color information for each of red (R), green (G), and blue (B), and the standard deviation of fog patterns is designed to be influenced by an allowable level.

In Equation 4 above, ij denotes the xy coordinates in the image, n denotes the number of pixels on the x axis, and m denotes the number of pixels on the y axis.

Flood fill analysis may be performed in association with contour extraction.

It may be reconfigured as a matrix function, the features of fog color information may be analyzed, and the fog pattern recognition may be represented and displayed in blue.

In this case, a flood fill-based fog pattern recognition algorithm may be implemented for each crisis level (extreme/high/moderate/low).

TABLE 3

| 1 | Date | y | VR | U |
|---|---|---|---|---|
| 2 | 2019-09-02 10:19 | 81.6 | 36.7 | 10.4 |
| 3 | 2019-09-02 10:20 | 81.2 | 33.1 | 9.9 |
| 4 | 2019-09-02 10:21 | 81.3 | 33.9 | 10 |
| 5 | 2019-09-02 10:22 | 81.3 | 33.9 | 10 |
| 6 | 2019-09-02 10:23 | 80.2 | 26.1 | 8.9 |
| 7 | 2019-09-02 10:24 | 81.4 | 34.8 | 10.1 |
| 8 | 2019-09-02 10:25 | 81.3 | 33.9 | 10 |
| 9 | 2019-09-02 10:26 | 81.3 | 33.9 | 10 |
| 10 | 2019-09-02 10:27 | 81.3 | 33.9 | 10 |
| 11 | 2019-09-02 10:28 | 81.3 | 33.9 | 10 |
| 12 | 2019-09-02 10:29 | 80.2 | 26.1 | 8.9 |
| 13 | 2019-09-02 10:30 | 80.3 | 26.7 | 9 |
| 14 | 2019-09-02 10:31 | 80.9 | 30.7 | 9.6 |

TABLE 3-continued

| 1 | Date | y | VR | U |
|---|---|---|---|---|
| 15 | 2019-09-02 10:32 | 81.1 | 32.3 | 9.8 |
| 16 | 2019-09-02 10:33 | 81.3 | 33.9 | 10 |
| 17 | 2019-09-02 10:34 | 79.8 | 23.9 | 8.6 |
| 18 | 2019-09-02 10:35 | 79.5 | 22.5 | 8.4 |
| 19 | 2019-09-02 10:36 | 81.2 | 33.1 | 9.9 |
| 20 | 2019-09-02 10:37 | 79.3 | 21.6 | 8.2 |
| 21 | 2019-09-02 10:38 | 79.3 | 21.6 | 8.2 |
| 22 | 2019-09-02 10:39 | 80 | 25 | 8.8 |
| 23 | 2019-09-02 10:40 | 79.9 | 24.5 | 8.7 |

The visual range of the analysis target image may be calculated or obtained, as an image visual range, by a contour extraction and fog pattern recognition image analysis method. Referring to Table 3, the Y coordinate, visual range (R), and uncertainty degree (U) are included as elements to be calculated or obtained.

What is not described regarding the road fog detection device and method in connection with FIGS. 7 to 11 is the same or easily inferred from what has been described regarding the road fog detection device and method in connection with FIGS. 1 to 6, and no detailed description thereof is thus presented.

FIGS. 12, 13, 14, and 15 are views illustrating screens of a program for driving a fog monitoring device in a road fog detection device according to an embodiment of the disclosure.

Figure 12:
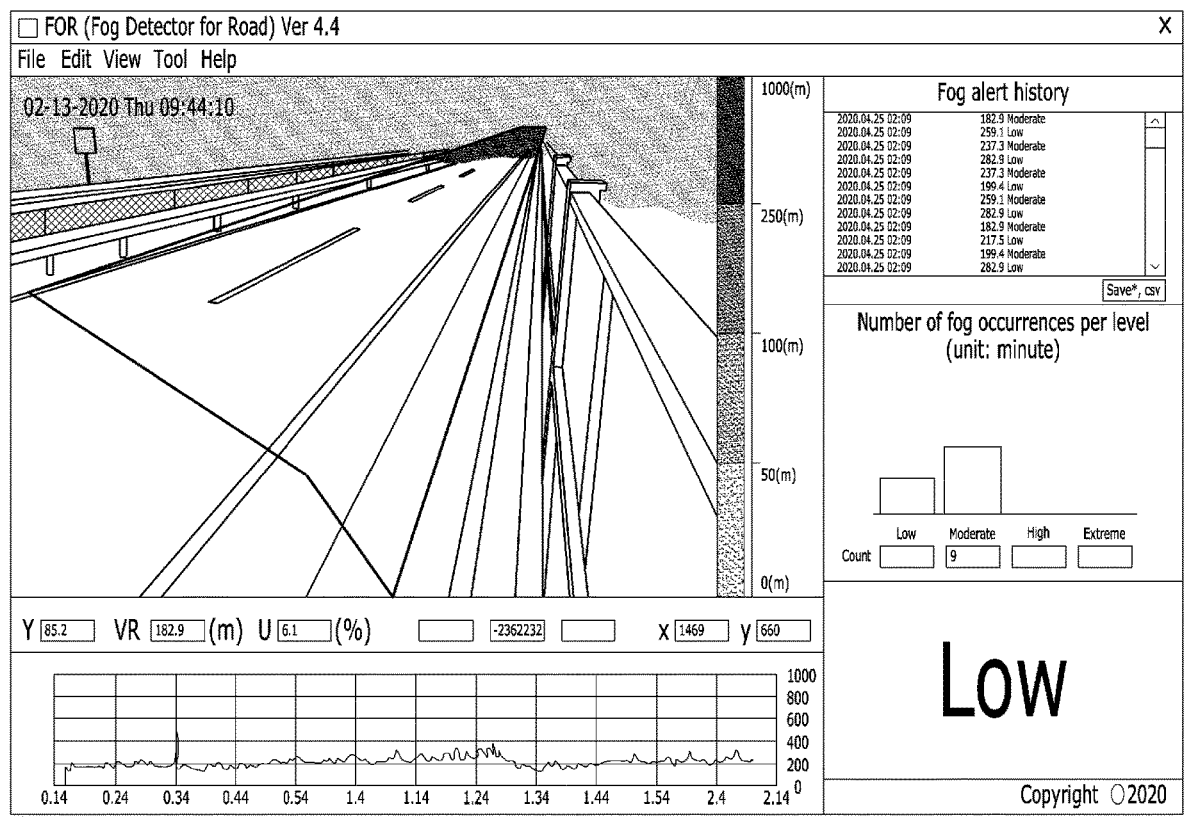

FIG. 12 shows an example road fog detection screen output or displayed on a manager's terminal, according to an embodiment.

Figure 14:
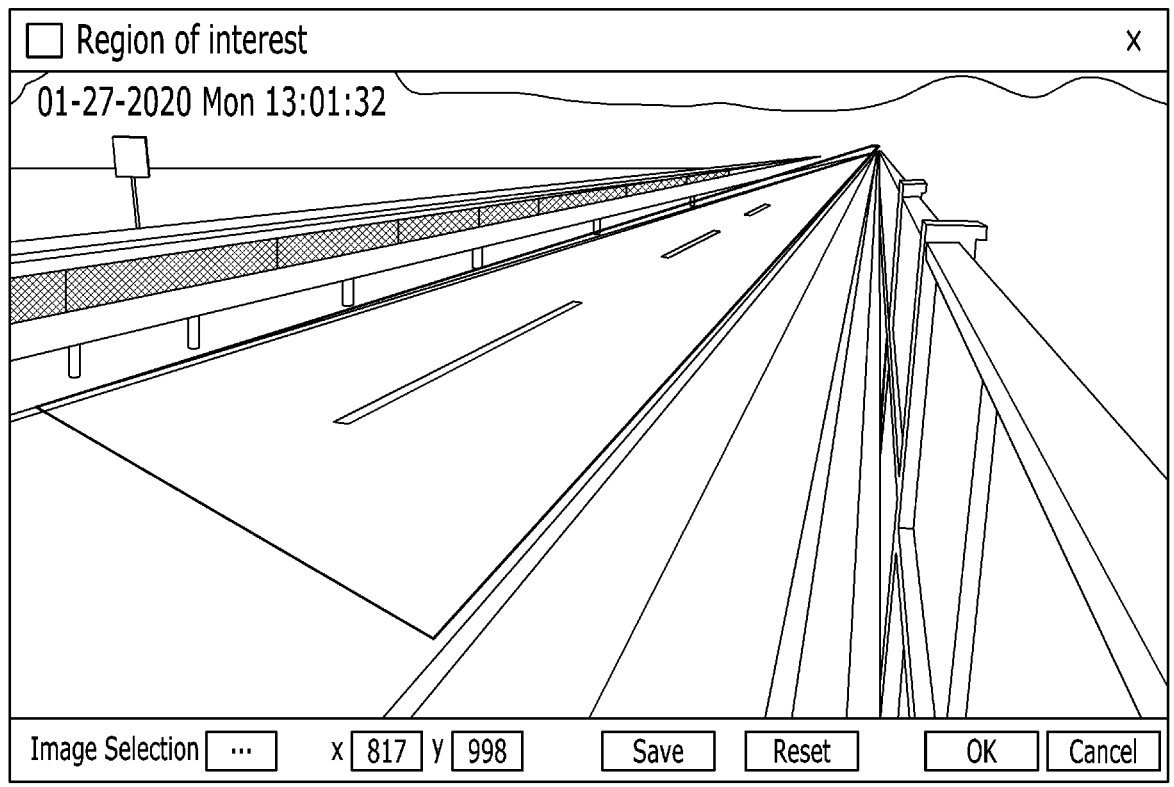

The constants or variables of Table 1 may be set via a settings window, screen, or interface of FIG. 13. A region of interest may be set as shown in FIG. 14. A contour level, display time, or fog level may be set via a system settings interface as shown in FIG. 15.

What is not described regarding the road fog detection device and method in connection with FIGS. 12 to 15 is the same or easily inferred from what has been described regarding the road fog detection device and method in connection with FIGS. 1 to 15, and no detailed description thereof is thus presented.

FIGS. 16 and 17 are photos of a prototype imaging device of a road fog detection device and an installation site according to an embodiment of the disclosure.

The imaging device 100, according to an embodiment, may be installed as shown in FIGS. 16 and 17.

The imaging device 100 may be installed on a median strip as shown in FIG. 17.

What is not described regarding the road fog detection device and method in connection with FIGS. 16 and 17 is the same or easily inferred from what has been described regarding the road fog detection device and method in connection with FIGS. 1 to 15, and no detailed description thereof is thus presented.

The device and method for detecting fog on the road described with reference to FIGS. 1 to 17 may be implemented in the form of a recording medium or computer-readable medium containing computer-executable instructions or commands, such as an application or program module executable on a computer.

The computer-readable medium may be an available medium that is accessible by a computer. The computer-readable storage medium may include a volatile medium, a non-volatile medium, a separable medium, and/or an inseparable medium.

The computer-readable medium may include a computer storage medium.

The computer storage medium may include a volatile medium, a non-volatile medium, a separable medium, and/or an inseparable medium that is implemented in any method or scheme to store computer-readable commands, data architecture, program modules, or other data or information.

According to an embodiment, the above-described road fog detection device and method may be executed by an application installed on a terminal, including a platform equipped in the terminal or a program included in the operating system of the terminal), or may be executed by an application (or program) installed by the user on a master terminal via an application providing server, such as a web server, associated with the service or method, an application, or an application store server.

According to an embodiment, the above-described road fog detection device and method may be implemented in an application or program installed as default on the terminal or installed directly by the user and may be recorded in a recording medium or storage medium readable by a terminal or computer.

Although embodiments of the present disclosure have been described with reference to the accompanying drawings, It will be appreciated by one of ordinary skill in the art that the present disclosure may be implemented in other various specific forms without changing the essence or technical spirit of the present disclosure.

Thus, it should be noted that the above-described embodiments are provided as examples and should not be interpreted as limiting.

Each of the components may be separated into two or more units or modules to perform its function(s) or operation(s), and two or more of the components may be integrated into a single unit or module to perform their functions or operations.

It should be noted that the scope of the present disclosure is defined by the appended claims rather than the described description of the embodiments and include all modifications or changes made to the claims or equivalents of the claims.

What is claimed is:

1. A device for detecting fog on a road, the device comprising:
    an imaging device installed to capture a two-way road and capturing a fog on the two-way road;
    a network configuring device provided under the imaging device and transmitting an image captured by the imaging device;
    a fog monitoring device receiving the image from the network configuring device, analyzing the image to thereby detect the fog, and outputting an alert per predetermined crisis level; and
    a display device displaying the alert output from the fog monitoring device and transmitting the alert via a wired or wireless network, wherein the imaging device includes:
    a camera capturing the two-way road;
    a bracket provided under the camera and adjusting a direction thereof using a bolt and a nut;
    a median strip guardrail fixing base formed in a double-winged structure to be mounted on a median strip guardrail without damaging the median strip guardrail and fixed to, or removed from, the median strip guardrail using a bolt and a nut; and a supporting pole connecting the bracket with the median strip guardrail fixing base and adjusting a height thereof using at least one bolt.

2. A device for detecting fog on a road, the device comprising:
a an imaging device installed to capture a two-way road and capturing a fog on the two-way road;
a network configuring device provided under the imaging device and transmitting an image captured by the imaging device;
a fog monitoring device receiving the image from the network configuring device, analyzing the image to thereby detect the fog, and outputting an alert per predetermined crisis level; and
a display device displaying the alert output from the fog monitoring device and transmitting the alert via a wired or wireless network, wherein the fog monitoring device includes:
an image receiver installed within a predetermined distance from a site where the imaging device is installed and storing the image from the camera of the imaging device and outputting the image;
an image analyzer equipped with a fog detection program configured to detect the fog using the image output from the image receiver, receiving image settings for the site where the imaging device is installed, a fog detection condition, and an crisis level determination condition, and outputting a detection result corresponding to the received image settings, the fog detection condition, and the crisis level determination condition; and
a result display displaying information resultant from detecting and analyzing the fog by the image analyzer and transmitting the displayed information via the wired or wireless network.

3. The device of claim 2, wherein the image settings are intended to set at least one element value for distance calculation according to an installation environment of the camera of the imaging device, and wherein
the fog detection condition and the crisis level determination condition correspond to system settings.

4. A fog alerting method performed by a fog alerting device, the fog alerting method comprising:
receiving an image transmitted from an imaging device capturing a two-way road and calculating a distance to a site where a fog occurs;
determining a contour of the fog from the image and then recognizing the fog by determining a region of the fog from the determined contour; and
calculating a distance between a position of the imaging device and a visible point recognized in the image and, when the distance between the position of the imaging device and the visible point corresponds to a distance per predetermined level, outputting an alert corresponding to the distance per predetermined level.

5. The fog alerting method of claim 4, wherein
receiving the image transmitted from the imaging device capturing the two-way road and calculating the distance to the site where the fog occurs includes:
converting a road image in the image into a two-dimension (2D) plane with coordinates;
establishing image settings for setting at least one element value for distance calculation to calculate the distance to the site where the fog occurs, from the image;
calculating the distance to the site where the fog occurs, using the at least one element value for distance calculation and an equation represented as:

$$R = n \left\{ \frac{D_{max}(Y_{max} - Y)}{e + D_{max}Y_{max}} \right\}^{-f} - n + s \times H \times \frac{L_{set}}{L_{std}} \times e^{v}$$

wherein R denotes the distance to the site where the fog occurs, n denotes a correction constant for near distance, Dmax denotes a maximum distance, Ymax denotes maximum coordinates, Y denotes fog recognition coordinates, e denotes a correction constant for effective distance, f denotes a correction constant for far distance, s denotes a correction constant for shortest distance, H denotes a height or altitude, Lset denotes a lens setting focal length, Lstd denotes a lens standard focal length, and v denotes a correction constant for vertical angle.

6. The fog alerting method of claim 4, wherein
determining the contour of the fog from the image and then recognizing the fog by determining the region of the fog from the determined contour includes:
setting a strength of extraction of the contour of the fog and selecting a lower end of a vertical contour by selecting and separating a horizontal contour among a plurality of contours;
when an original color of the selected lower end of the vertical contour is a chromatic color, excluding the vertical contour; and
determining that a contour in a predetermined analysis target space is the contour of the fog, and wherein
the contour of the fog is determined using a Sobel edge detector.

7. The fog alerting method of claim 4, wherein
determining the contour of the fog from the image and then recognizing the fog by determining the region of the fog from the determined contour includes:
when the region of the fog is determined, extracting a contour of a predetermined analysis target space from the contour of the fog;
determining a red-green-blue (RGB) value of a color coordinate system from the contour of the predetermined analysis target space;
determining a fog feature value based on the RGB value;
when an RGB value of a coordinate neighboring any one coordinate in the contour of the predetermined analysis target space is smaller than the fog feature value, selecting the any one coordinate; and
recognizing the fog by displaying the selected any one coordinate on a space, and wherein
recognition analysis of the fog is performed by pattern recognition analysis including a flood fill scheme.

8. The fog alerting method of claim 4, wherein
calculating the distance between the position of the imaging device and the visible point recognized in the image and, when the distance between the position of the imaging device and the visible point corresponds to the distance per predetermined level, outputting the alert corresponding to the distance per predetermined level includes:
when the distance to the visible point is less than 1 km, estimating the occurrence of the fog; and
outputting an alert corresponding to a distance for each of low, moderate, high, and extreme levels as the distance to the visible point reduces.

9. The fog alerting method of claim 8, wherein
the alert corresponding to the distance for each level indicates a normal level when the distance to the visible point is 1 km or more, the low level when the distance to the visible point is less than 1 km, the moderate level when the distance to the visible point is less than 250 m, the high level when the distance to the visible point is less than 100 m, and the extreme level when the distance to the visible point is less than 50 m.

* * * * *